(12) United States Patent
Rule et al.

(10) Patent No.: US 7,209,507 B2
(45) Date of Patent: Apr. 24, 2007

(54) METHOD AND APPARATUS FOR CONTROLLING THE OUTPUT OF A GAS DISCHARGE MOPA LASER SYSTEM

(75) Inventors: John A. Rule, Hingham, MA (US); Paolo Zambon, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 123 days.

(21) Appl. No.: 10/740,659

(22) Filed: Dec. 18, 2003

(65) Prior Publication Data

US 2005/0135451 A1 Jun. 23, 2005
US 2005/0238077 A9 Oct. 27, 2005

Related U.S. Application Data

(63) Continuation-in-part of application No. 10/631,349, filed on Jul. 30, 2003, now Pat. No. 7,039,086.

(51) Int. Cl.
H01S 3/22 (2006.01)

(52) U.S. Cl. ............................ 372/58; 372/57
(58) Field of Classification Search ............ 372/55–59
See application file for complete search history.

(56) References Cited

U.S. PATENT DOCUMENTS

| 4,223,279 | A |   | 9/1980 | Bradford, Jr. et al. ..... 331/94.5 |
| 4,455,658 | A |   | 6/1984 | Sutter et al. ................. 372/38 |
| 4,959,840 | A |   | 9/1990 | Akins et al. ................. 372/57 |
| 5,017,499 | A | * | 5/1991 | Hakuta et al. .............. 436/124 |
| 5,023,884 | A |   | 6/1991 | Akins et al. ................. 372/57 |
| 5,025,445 | A |   | 6/1991 | Anderson et al. ............ 372/20 |
| 5,025,446 | A |   | 6/1991 | Kuizenga ..................... 372/21 |
| 5,090,020 | A | * | 2/1992 | Bedwell ....................... 372/59 |
| 5,142,543 | A |   | 8/1992 | Wakabayashi et al. ........ 372/32 |
| 5,149,659 | A | * | 9/1992 | Hakuta et al. ................ 436/55 |
| 5,189,678 | A |   | 2/1993 | Ball et al. .................... 372/28 |
| 5,313,481 | A |   | 5/1994 | Cook et al. ................... 372/37 |
| 5,315,611 | A |   | 5/1994 | Ball et al. .................... 372/56 |

(Continued)

FOREIGN PATENT DOCUMENTS

JP 2601410 1/1997

(Continued)

Primary Examiner—Minsun Gh Harvey
Assistant Examiner—Phillip Nguyen
(74) Attorney, Agent, or Firm—William C. Cray

(57) ABSTRACT

A method and apparatus are disclosed for controlling the output of a two chamber gas discharge laser comprising an oscillator gas discharge laser and an amplifier gas discharge laser that may comprise establishing a multidimensional variable state space comprising a coordinate system having at least two coordinates, each coordinate comprising a selected variable representing an operating parameter of the oscillator or the amplifier; tracking a multidimensional operating point in the multidimensional variable state space according to the variation of the selected variables in either or both of the oscillator or the amplifier to determine the position of the multidimensional operating point in the multidimensional state space; determining from the position of the multidimensional operating point in the multidimensional operating space a region from a plurality of defined regions in the multidimensional operating space in which the multidimensional operating point is located and identifying the region.

42 Claims, 8 Drawing Sheets
(3 of 8 Drawing Sheet(s) Filed in Color)

U.S. PATENT DOCUMENTS

| | | | |
|---|---|---|---|
| 5,359,620 A | 10/1994 | Akins | 372/58 |
| 5,440,578 A * | 8/1995 | Sandstrom | 372/59 |
| 5,448,580 A | 9/1995 | Birx et al. | 372/38 |
| 5,450,436 A * | 9/1995 | Mizoguchi et al. | 372/59 |
| 5,471,965 A | 12/1995 | Kapich | 123/565 |
| 5,642,374 A * | 6/1997 | Wakabayashi et al. | 372/57 |
| 5,754,579 A | 5/1998 | Mizoguchi et al. | 372/58 |
| 5,852,621 A | 12/1998 | Sandstrom | 372/25 |
| 5,863,017 A | 1/1999 | Larson et al. | 248/176.1 |
| 5,953,360 A | 9/1999 | Vitruk et al. | 372/87 |
| 5,978,394 A | 11/1999 | Newman et al. | 372/32 |
| 5,978,406 A * | 11/1999 | Rokni et al. | 372/58 |
| 5,991,324 A | 11/1999 | Knowles et al. | 372/57 |
| 6,005,879 A | 12/1999 | Sandstrom et al. | 372/25 |
| 6,016,325 A | 1/2000 | Ness et al. | 372/38 |
| 6,018,537 A | 1/2000 | Hofmann et al. | 372/25 |
| 6,028,880 A * | 2/2000 | Carlesi et al. | 372/58 |
| 6,067,311 A | 5/2000 | Morton et al. | 372/57 |
| 6,094,448 A | 7/2000 | Fomenkov et al. | 372/102 |
| 6,104,735 A | 8/2000 | Webb | 372/37 |
| 6,128,323 A | 10/2000 | Myers et al. | 372/38 |
| 6,130,904 A * | 10/2000 | Ishihara et al. | 372/59 |
| 6,151,349 A | 11/2000 | Gong et al. | 372/58 |
| 6,151,350 A * | 11/2000 | Komori et al. | 372/59 |
| 6,164,116 A | 12/2000 | Rice et al. | 73/1.72 |
| 6,192,064 B1 | 2/2001 | Algots et al. | 372/99 |
| 6,208,674 B1 | 3/2001 | Webb et al. | 372/57 |
| 6,208,675 B1 | 3/2001 | Webb | 372/58 |
| 6,212,211 B1 * | 4/2001 | Azzola et al. | 372/33 |
| 6,212,214 B1 | 4/2001 | Vogler et al. | 372/59 |
| 6,219,368 B1 | 4/2001 | Govorkov | 372/59 |
| 6,240,117 B1 | 5/2001 | Gong et al. | 372/58 |
| 6,243,406 B1 | 6/2001 | Heist et al. | 372/59 |
| 6,317,447 B1 | 11/2001 | Partlo et al. | 372/57 |
| 6,330,261 B1 | 12/2001 | Ishihara et al. | 372/38.1 |
| 6,330,267 B1 * | 12/2001 | Vogler et al. | 372/59 |
| 6,389,052 B2 * | 5/2002 | Albrecht et al. | 372/58 |
| 6,414,979 B2 | 7/2002 | Ujazdowski et al. | 372/87 |
| 6,477,193 B2 | 11/2002 | Oliver et al. | 372/58 |
| 6,490,307 B1 * | 12/2002 | de Mos et al. | 372/59 |
| 6,490,308 B2 * | 12/2002 | Albrecht et al. | 372/59 |
| 6,493,370 B2 * | 12/2002 | Albrecht et al. | 372/58 |
| 6,504,861 B2 * | 1/2003 | Albrecht et al. | 372/59 |
| 6,529,533 B1 * | 3/2003 | Voss | 372/29.01 |
| 6,563,853 B2 | 5/2003 | Heist et al. | 372/57 |
| 6,567,450 B2 * | 5/2003 | Myers et al. | 372/55 |
| 6,704,340 B2 * | 3/2004 | Ershov et al. | 372/58 |
| 6,798,812 B2 * | 9/2004 | Rylov et al. | 372/55 |
| 6,865,210 B2 * | 3/2005 | Ershov et al. | 372/55 |
| 6,879,617 B2 * | 4/2005 | Ariga et al. | 372/55 |
| 6,904,073 B2 * | 6/2005 | Yager et al. | 372/57 |
| 6,963,595 B2 * | 11/2005 | Rule et al. | 372/55 |
| 2001/0012309 A1 | 8/2001 | Albrecht et al. | 372/55 |
| 2002/0101902 A1 | 8/2002 | Albrecht et al. | 372/58 |
| 2002/0110174 A1 | 8/2002 | Albrecht et al. | 372/58 |
| 2002/0186739 A1 | 12/2002 | Sandstrom et al. | 372/55 |
| 2005/0259709 A1* | 11/2005 | Das et al. | 372/55 |

FOREIGN PATENT DOCUMENTS

| | | |
|---|---|---|
| JP | 09-097951 | 4/1997 |
| JP | 2701184 | 10/1997 |
| JP | 10-074993 | 3/1998 |
| JP | 2000-022255 | 1/2000 |
| JP | 2001-1332793 | 11/2001 |
| JP | 2002-208746 | 7/2002 |
| JP | 3297108 | 7/2002 |
| JP | 2002-294856 | 10/2002 |

* cited by examiner

METHOD AND APPARATUS FOR CONTROLLING THE OUTPUT OF A GAS DISCHARGE MOPA LASER SYSTEM

BACKGROUND OF THE INVENTION

Halogen based, and particularly fluorine based gas discharge lasers, e.g., KrF and ArF excimer lasers and molecular fluorine lasers are well known. They have been implemented in MOPA configurations, i.e., a master oscillator and a power amplifier, in which, e.g., a gas discharge laser, which is in a resonator cavity configuration, and with a very accurate line narrowing module or package ("LNM" or "LNP") produces a seed laser beam with a precisely defined center wavelength and a bandwidth on the order of femptometers. This then is amplified in power in another (or the same) chamber by a power-amplifying laser injected with the output of the oscillator. The configuration may also be a MOPO, in which the power amplifier is also an oscillating resonator cavity. The output parameters of both the oscillator and amplifier depend on a variety of operating parameters, including the initial makeup of the gases, usually a halogen, e.g., fluorine, a noble gas, e.g., argon or krypton, and a buffer, e.g., neon. The makeup of these gasses in the oscillator and amplifier also varies over time, particularly as the halogen is consumed in the creating of the laser light output of the gas discharges occurring within the chamber containing the gasses in the oscillator or the amplifier. It has been found that previously used techniques for accounting for such things as the changes in the gas composition over time in older single chamber oscillating gas discharge lasers, i.e., without the addition of a power amplifier, are not very effective with MOPA or MOPO configurations, and especially so with the MO and PA or PO (hereinafter referred to simply as the PA) in separate chambers.

Coupling between the gas mixes in the two chambers, along with utilizations of, e.g., prior schemes, e.g., a "boost" scheme, e.g., applied to only one chamber, e.g., the PA chamber has been found to cause the gas mix to get out of balance between the MO and PA chambers.

Current $F_2$ monitor and control unsatisfactory performance can be thought to stem primarily from at least the following two flaws:
1. Voltage accounting is adversely affected by the non-linear voltage response to duty cycle changes as a function of current $F_2$ concentration, that is, the voltage change due to a 75% to 6% DC change is not the same when the fill is rich versus lean; and
2. The boost logic which compensates for an excessive rise or drop in voltage currently only applies to the PA chamber, which can drive the gas mix in the two chambers out of balance.

In the past applicants had used a so-called NewOpPoint state. The original purpose of the NewOpPoint state was to track voltage changes associated with duty cycle and energy setpoint changes. Then, only one reference voltage—plus a carefully accounted-for reference voltage offset—was originally thought to properly maintain the laser gas state. This was found in practice to provide less than acceptable performance.

The design according to preferred embodiments f the present invention set for below is intended to address the above noted flaws, with the goal of improved gas mix regulation.

A number of prior art patents and published applications address various ways of monitoring and controlling gas mix in halogen gas discharge lasers, e.g., excimer lasers and molecular fluorine lasers. U.S. Pat. No. 5,978,406, issued to Rokni, et al. on Nov. 2, 1999, entitled FLUORINE CONTROL SYSTEM FOR EXCIMER LASERS, based upon an application Ser. No. 09/016,525, filed on Jan. 30, 1998, and assigned to Cymer, related to fluorine gas replenishment at a continuous or substantially continuous rates based upon feedback from a real time or substantially real time fluorine monitor to maintain fluorine at substantially a selected value. U.S. Pat. No. 6,028,880, issued to Carlesi, et al. on Feb. 22, 2000, entitled AUTOMATIC FLUORINE CONTROL SYSTEM, based upon an application Ser. No. 09/109,596 filed on Jul. 2, 1998, which was a continuation in part of Ser. No. 09/016,525, filed on Jan. 30, 1998, now U.S. Pat. No. 5,978,406 and assigned to Cymer relates to fluorine gas replenishment at continuous or substantially continuous rates based upon feedback from a real time or substantially real time fluorine monitor, from a fluorine source at high pressure through a bottle having a volume of at least 0.3 liters, to maintain fluorine at substantially a selected value. U.S. Pat. No. 6,240,117, issued to Gong, et al. on May 29, 2001, entitled FLUORINE CONTROL SYSTEM WITH FLUORINE MONITOR, based on a application Ser. No. 09/191,446, filed on Nov. 12, 1998, which was a continuation-in-part of Ser. No. 09/016,525, filed Jan. 30, 1998 now U.S. Pat. No. 5,978,406 issued date Nov. 2, 1999 entitled FLUORINE CONTROL SYSTEM FOR EXCIMER LASER and Ser. No. 09/109,596 filed Jul. 2, 1998 now U.S. Pat. No. 6,028,880 issue date Feb. 22, 2000 entitled "Automatic Fluorine Control System" relates to an $F_2$ replenishment system based upon the amount of fluorine found in a sample taken from "downstream of said blower" (i.e., in the chamber) measured with an absorption meter, first passing through a metal fluoride trap. U.S. Pat. No. 6,151,349, issued to Gong, et al. on Nov. 21, 2000, entitled AUTOMATIC FLUORINE CONTROL SYSTEM, and assigned to Cymer, based on an application Ser. No. 09/368, 208, filed on Aug. 4, 1999, which was a CIP of an application Ser. No. 09/034,870 filed Mar. 4, 1998, now U.S. Pat. No. 6,005,879 entitled PULSE ENERGY CONTROL FOR EXCIMER LASERS relates to micro-bursts of fluorine injection comprising controlled periodic fluorine injections at intervals as low as about 3 to 5 minutes, also said to be an "almost continuous basis." The claims are worded in such a way that continuous or substantially continuous flow of fluorine could be covered. The feedback for control is $\Delta E/\Delta V$, the change in laser output with change in charging voltage. United States Published Patent Application No. 20020186739, filed in the name of Sandstrom et al., and published on Dec. 12, 2002, entitled INJECTION SEEDED F2 LASER WITH WAVELENGTH CONTROL, and assigned to Cymer relates to adjusting laser gas pressure, buffer gas mix, $F_2$ partial pressure to control the "centerline wavelength" of the output beam in a two chamber laser. Cymer Docket No. 2002-0070-01, inventors Ishihara, et al., filed on Nov. 27, 2002, Ser. No. 60/429,493, entitled AUTOMATIC GAS CONTROL SYSTEM FOR A TWO CHAMBER LASER, and assigned to Cymer, relates to $F_2$ replenishment based upon the history of consumption rates over the laser life. Cymer Docket No. 2003-0001-01, inventors Rule, et al., filed on Jan. 31, 2003, Ser. No. 10/356,168, entitled AUTOMATIC GAS CONTROL SYSTEM FOR A GAS DISCHARGE LASER, and assigned to Cymer, relates to $F_2$ replenishment based upon the history of consumption rates over the laser life. U.S. Pat. No. 6,212,214, issued to Vogler, et al. on Apr. 3, 2001, entitled PERFORMANCE CONTROL SYSTEM AND METHOD FOR GAS DISCHARGE LASERS, and assigned to Lambda Physik, relates to gas replenishment based upon the comparison of a master data set of the relationship between an output beam parameter known to vary with gas mixture status versus an input parameter and an actual data set taken during operation. U.S. Pat. No. 6,243,406, issued to Heist, et al. on Jun. 5, 2001, entitled GAS PERFORMANCE CONTROL SYSTEM FOR GAS DISCHARGE LASERS and assigned to Lamda Physik, relates to gas replenishment based upon amplified spontaneous emission (ASE) of the laser. U.S. Pat. No. 6,330,267, issued to Vogler, et al. on Dec. 11, 2001, entitled PERFORMANCE CONTROL SYSTEM AND METHOD FOR GAS DISCHARGE LASERS, and assigned to Lambda Physik, relates to halogen gas replenishment based upon the slope of an output parameter of the laser compared to an expected slope of the parameter giving an estimate of the deviation of the halogen from the optimum; and specifically claimed as the laser output versus input energy. U.S. Pat. No. 6,389,052, issued to Albrecht, et al. on May 14, 2002, entitled LASER GAS REPLENISHMENT METHOD, and assigned to Lambda Physik, relates to replenishment of gas at selected intervals with amount or the interval based on charging voltage variation to achieve output pulse power. U.S. Pat. No. 6,490,307, issued to de Mos, et al. on Dec. 3, 2002, entitled METHOD AND PROCEDURE TO AUTOMATICALLY STABILIZE EXCIMER LASER OUTPUT PARAMETERS, and assigned to Lambda Physik, relates to fluorine replenishment by inserting between 0.0001 mbar and 0.2 mbar of fluorine into the chamber at selected intervals or inserting constituent gas to increase total pressure in the chamber by a selected amount, or to increase the partial pressure of fluorine by between 0.0001 and 0.2 mbar at periodic intervals to return the fluorine gas substantially to said predetermined partial pressure; or based upon maintaining "relatively constant" laser output; or injecting fluorine at less than 5% of the amount in the chamber repeatedly to maintain relatively constant laser output; or less than 7% of the amount in the chamber at selected intervals; or less than 3% at selected intervals; or less than 0.1 mbar at selected intervals; or less than 0.05% mbar at selected intervals; or 0.02% mbar at selected intervals; or less than 10% halogen and buffer mix at selected intervals; or less than 5 mbar of halogen and buffer mix at selected intervals; or less than 2 mbar of halogen and buffer mix at selected intervals; or less than 1 mbar of halogen and buffer mix at selected intervals; and various other halogen buffer mixes of different percentages at different mbar maximums at selected intervals. U.S. Pat. No. 6,490,308, issued to Albrecht, et al. on Dec. 3, 2002, entitled LASER GAS REPLENISHMENT METHOD and assigned to Lambda Physik, relates to replenishment based on the value of the charging voltage. U.S. Pat. No. 6,493,370, issued to Albrecht, et al. on Dec. 10, 2002, entitled LASER GAS REPLENISHMENT METHOD and assigned to Lambda Physik, relates to a laser having a gas replenishment control system using a processor employing an algorithm for periodically determining gas actions for the gas supply unit to smoothly perform the gas actions which stabilize a composition of the laser gas mixture within the discharge chamber and to stabilize significant parameters of the laser beam, and in which the gas supply unit and said processor are configured to permit a quantity in a range substantially between 0.0001 mbar and 0.2 mbar of said halogen-containing constituent gas to inject into said laser tube at selected intervals, such that a degradation of the halogen-containing constituent gas is automatically compensated without substantially disturbing laser beam parameters, and also expressly claiming the gas is a halogen and the processor also controls discharge voltage based at least in part on energy information received from an energy detector; and also expressly claiming the control is based on discharge voltage variation necessary for a predetermined output energy. U.S. Pat. No. 6,504,861, issued to Albrecht, et al. on Jan. 7, 2003, entitled LASER GAS REPLENISHMENT METHOD, assigned to Lambda Physik, relates to replenishment periodically between a certain range of mbar of a gas, based upon a known amount injected in a prior replenishment which amount injected in the prior replenishment was based on a known amount of the gas in the chamber prior to the last injection; and also claimed is varying the intervals based on the same criteria. U.S. Pat. No. 6,529,533, issued to Voss on Mar. 4, 2003, entitled BEAM PARAMETER MONITORING UNIT FOR A MOLECULAR FLUORINE (F2) LASER, assigned to Lambda Physik, relates to a molecular fluorine laser with fluorine replenishment based upon detected value of at least one of energy, energy stability, bandwidth, wavelength, beam profile, pulse shape, pulse duration, output power, pulse length and pulse to pulse stability relating to the UV beam, the red beam having been separated from the UV beam. U.S. Pat. No. 6,563,853, issued to Heist, et al. on May 13, 2003, entitled GAS PERFORMANCE CONTROL SYSTEM FOR GAS DISCHARGE LASERS, and assigned to Lambda Physik, relates to gas replenishment based upon a sample of the amplified spontaneous emission (ASE) output of the laser. United States Published Patent Application No. 20010012309 filed in the name of Albrecht, et al. and published on Aug. 9, 2001, entitled LASER GAS REPLENISHMENT METHOD, and assigned to Lambda Physik, relates to gas replenishment with the amount at selected intervals of the intervals chosen based on the charging voltage; or also claimed based on the amount injected in a previous injection. United States Published Patent Application No. 20020101901, filed in the name of Albrecht, et al. and published on Aug. 1, 2002, entitled LASER GAS REPLENISHMENT METHOD, and assigned to Lambda Physik, relates to a laser gas replenishment at periodic intervals from within a pre-selected range with the amount from within the range or the interval selected based upon a calculated amount of replenishment in the last replenishment. United States Published Patent Application No. 20020101902, filed in the name of Albrecht, et al. and published on Aug. 1, 2002, entitled Laser gas replenishment method and assigned to Lambda Physik, relates to laser gas replenishment utilizing a processor based upon charging voltage. United States Published Patent Application No. 20020110174, filed in the name of Albrecht, et al., and published on Aug. 15, 2002, entitled LASER GAS REPLENISHMENT METHOD, and assigned to Lambda Physik, relates to halogen gas replenishment of less that 0.2 mbar, or halogen constituent gas at less than 7% of current chamber content, at regularly selected intervals, or also claimed at same limits with replenishment interval based on charging voltage. U.S. Pat. No. 5,142,543, issued to Wakabayashi, et al. on Aug. 25, 1992, entitled METHOD AND SYSTEM FOR CONTROLLING NARROW-BAND OSCILLATION EXCIMER LASER, assigned to Komatsu, relates to gas replenishment based upon the charging voltage. U.S. Pat. No. 5,450,436 issued to Mizoguchi, et al. on Sep. 12, 1995, entitled LASER GAS REPLENISHING APPARATUS AND METHOD IN EXCIMER LASER SYSTEM, and assigned to Komatsu, relates to halogen gas replenishment based upon beam width and with periodic injection, i.e., with a predetermined amount varied up or down based on beam width; or alternatively claimed to inject a halogen constituent gas at predetermined intervals to a level that maintains total pressure and stopping the exhaust while injecting; or alternatively claimed injecting a predetermined amount after a predetermined number of pulses; or alternatively based on accumulated pulses and pulse rate; or alternatively claimed as replenishing the halogen on one pulse count and the rare gas on another and exhausting to maintain pressure; or alternatively claimed as replenishing the halogen based on pulse count and the rare gas based on charging voltage. U.S. Pat. No. 5,642,374, issued to Wakabayashi, et al. on Jun. 24, 1997, entitled EXCIMER LASER DEVICE, and assigned to Komatsu, relates to gas replenishment based upon laser output beam bandwidth. U.S. Pat. No. 5,754,579, issued to Mizoguchi, et al. on May 19, 1998, entitled LASER GAS CONTROLLER AND CHARGING/DISCHARGING DEVICE FOR DISCHARGE-EXCITED LASER, and assigned to Komatsu, relates to gas replenishment/exhaust based upon output of laser or alternatively claimed as based upon the charging voltage; including separately claimed based upon bandwidth. U.S. Pat. No. 6,130,904, issued to Ishihara, et al. on Oct. 10, 2000, entitled GAS SUPPLEMENTATION METHOD OF EXCIMER LASER APPARATUS, and assigned to Komatsu, relates to halogen gas replenishment based upon partial pressure; or alternatively claimed as based on band width; or alternatively claims supplementation of a mix of rare gas and buffer gas based upon a calculated oscillation stop time; or alternatively based upon a number of other possible parameters, including based upon laser output; or alternatively claimed as based upon a "power lock voltage"; or alternatively based upon the charging voltage; or alternatively based upon a pulse count.

Japanese Patent No. 2601410, the Published Application of which (08008481 was published on Jan. 12, 1996 (application 06134468 filed on Jun. 16, 1994), assigned to Komatsu (corresponding to U.S. Pat. No. 5,754,579, which claims priority from this application and another), refers to gas replenishment based on charging voltage or beam width and charging voltage. Japanese Patent No. 2701184, the Published Application of which (05192555 JP) was published on Apr. 23, 1993 (application 03290618 filed on Oct. 9, 1991), assigned to Komatsu, refers to controlling the mixture of the constituent gas mixture, based upon pulse count. Japanese Patent No. 3297108, issued on Jul. 2, 2002, assigned to Komatsu (U.S. Pat. No. 5,450,436 claims priority from this application and others), refers to gas replenishment after selected pulse count and replenishment to maintain chamber gas pressure. Claims, roughly translated refer to injection of rare gas based upon exhaust volume ("swept volume"). Japanese Published Patent Application No. 10074993 JP, published on Mar. 1, 1998, entitled GAS LASER AND LASER GAS INJECTION METHOD (Application 08246821, filed on Aug. 30, 1996) refers to gas replenishment with injections based upon chamber pressure. Japanese Patent Application No. 2001332793, published on Nov. 30, 2001 (Application JP 2000150874, filed on May 23, 2000), assigned to Komatsu, relates to feedback control, possibly including gas replenishment, based on beam properties. Japanese Published Patent Application No. 2002208746, published on Jul. 26, 2002 (Application JP 20011214 filed on Jan. 9, 2001), assigned to Komatsu, refers to replenishment based on a ratio of gases in the mixture in the chamber. Japanese Published Patent Application 10074993 JP, published on Mar. 1, 1998, based on Japanese application 08246821, filed on Aug. 30, 1996, by Wakabayashi, et al., entitled GAS LASER AND LASER GAS INJECTION METHOD, assigned to Komatsu (GigaPhoton), refers to a filtered replenishment based on chamber pressure. Japanese Published Patent Application No. 20020294856, published on Oct. 20, 2001 (Application JP 99272496, filed on Sep. 27, 1999), relates to replenishment of Xenon based upon Xe content apparently in the chamber. Japanese Published Patent Application No. 09097951 JP, published on Apr. 1, 1997, based on a Japanese Patent Application No. 07289105, filed on Sep. 29, 1995 by Senrin, et al., entitled EXCIMER LASER APPARATUS, and assigned to Nissin Electric, refers to replenishment based upon charging voltage. Japanese Published Patent application No. 2000022255, published on Jan. 21, 2000, with inventors Omi, et al., entitled METHOD FOR STABILIZING AND CONTROLLING FLUORINE GAS CONCENTRATION AND CONTROL MECHANISM THEREOF, based on a Japanese Patent Application No. JP19980191178, filed on Jul. 7, 1998 and assigned to Horiba, refers to measuring in real time the content of fluorine in the "mixed gas" by measuring absorption of UV light in the "mixed gas" and creating a feedback control signal to correct any excess or deficiency against a set value. The disclosures of all of the above are hereby incorporated by reference.

SUMMARY OF THE INVENTION

A method and apparatus are disclosed for controlling the output of a two chamber gas discharge laser comprising an oscillator gas discharge laser and an amplifier gas discharge laser that may comprise establishing a multidimensional variable state space comprising a coordinate system having at least two coordinates, each coordinate comprising a selected variable representing an operating parameter of the oscillator or the amplifier; tracking a multidimensional operating point in the multidimensional variable state space according to the variation of the selected variables in either or both of the oscillator or the amplifier to determine the position of the multidimensional operating point in the multidimensional state space; determining from the position of the multidimensional operating point in the multidimensional operating space a region from a plurality of defined regions in the multidimensional operating space in which the multidimensional operating point is located and identifying the region; based upon the identity of the identified region, and parameters of that region relative to the condition of an actuator in each of the oscillator and the amplifier, determining a necessary modification to the actuator for each of the oscillator and the amplifier to attempt to move the multidimensional operating point from the parameters indicated by the position of the multidimensional operating point being in the particular region to a preselected region in the coordinate system. The method and apparatus may also comprise establishing a multidimensional variable state space comprising a coordinate system having at least two coordinates, each coordinate comprising a selected variable representing an operating parameter of the oscillator or the amplifier; changing the gas mixture in one or both of the oscillator and amplifier by injection of at least one constituent gas in the gas mixture at least part of which injection for the respective oscillator and amplifier is based upon a calculated estimate of consumption of the at least one constituent gas in the gas mixture in the respective oscillator and amplifier from a prior change in the gas mixture; allowing the oscillator and amplifier to operate for a selected period of time with the changed gas mixture; determining the position of an operating point in the multidimensional variable state space and based upon the location of the operating point in the multidimensional state space determining a respective boost factor to modify the calculated estimate of consumption for the current change of the gas mixture in the respective oscillator and amplifier. A third dimension may be added relating to a spectral characteristic of the output of the oscillator or the amplifier, which may be bandwidth of the output of the amplifier, and including modifying that output with a beam correction device.

BRIEF DESCRIPTION OF THE DRAWINGS

The application file contains at least one drawing executed in color. Copies of this patent application publication with color drawing(s) will be provided by the Office upon request and payment of the necessary fee.

DETAILED DESCRIPTION OF PREFERRED EMBODIMENTS

Figure 1:
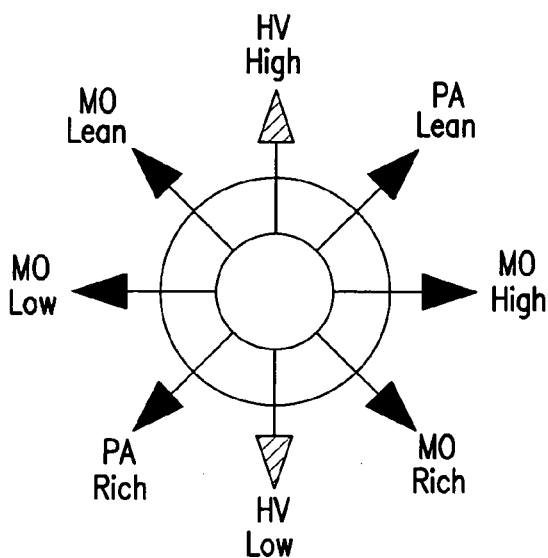
FIG. 1 shows a multidimensional operating state space according to an embodiment of the present invention.

The present invention takes into account that there are a number of possible operating states the laser system could be in, given two chambers (MO, PA) and defining several gas states, e.g., three relative gas states (Lean, Good, Rich). With "good" meaning within some pre-selected target range (which may vary over the life of the laser, e.g., as changes in the electrodes, or other effects on the discharge, cause, e.g., the charging voltage on the peaking capacitors to rise in order to maintain the desired output laser light pulse beam power requirements, which are generally dictated by the end users of the light and must be met), "lean" meaning out of range with the partial pressure low, and "rich" meaning out of range with the partial pressure high. Creating a table of the nine possible combinations ([MO Good, PA Good], [MO Good, PA Lean], [MO Good, PA Rich], etc., and combining this with possible indicators of operating performance, e.g., peaking capacitor charging voltage ("HV"), MO output energy ("Emo"), MOPA system gain ("MOPAg"), meaning the ratio of the PA output energy PAe to the Emo, the MO efficiency ("E/V$^2$")mo and Pa efficiency ("E/V$^2$")pa it is possible to list in table form what the various indicators should look like under the nine combinations. From this applicants have determined that, while other combinations may also be possible, the MO energy and HV are believed to be the most reliable pair. It is possible according to aspects of an embodiment of the present invention to arrange the variables for purposes of consideration into, e.g., a geometric interpretation of the results, e.g., the utilization of a multidimensional state space. Such a multi-dimensional state space may be, e.g., a two-dimensional state space for the expression of the gas control problem, e.g., with Cartesian coordinates x=Emo and y=HV. Applicants then overlaid these coordinates with "gas axes" of MO [F$_2$] and PA [F$_2$], e.g., rotated by 45° as is shown in FIG. 1.

Figure 2:
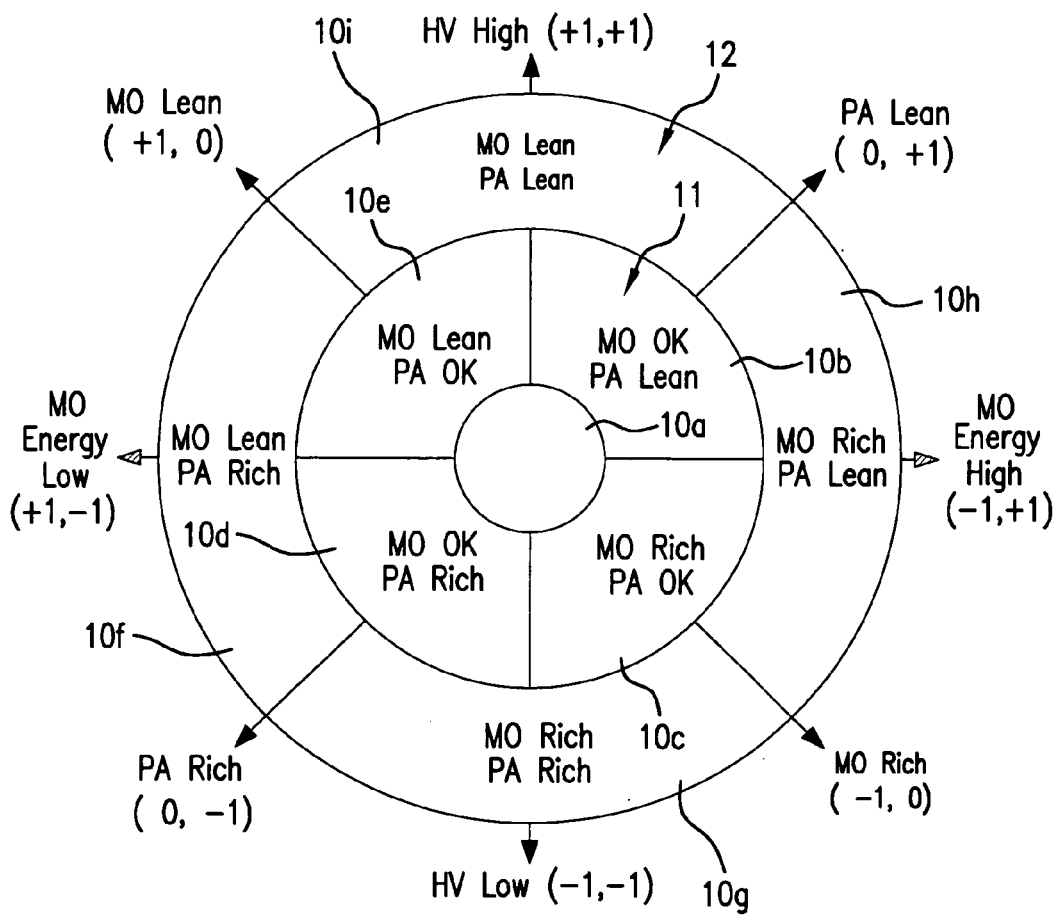
FIG. 2 shows a plurality of operation regions imposed upon the state space diagram of FIG. 1 according to an embodiment of the present invention.

According to aspects of an embodiment of the present invention applicants propose to provide a simple state-space representation in a multidimensional stat-space, e.g., the two dimensional state-space, of the two-chambered gas states. The system and process according to an embodiment of the present invention can then provide for a mapping from measurable quantities, e.g., Emo, HV, to a gas state (MO Lean/Good/Rich, PA Lean/Good/Rich) within one of the, e.g., nine possible combinations, including a center "target" of MOGood, PAGood, as shown in FIG. 2. This mapping can then provide a basis for determining operating parameter modifications, e.g., how much to modify the gas mixture in each chamber, e.g., selecting an amount for an inject size on each chamber, including zero, at each inject, and the time for each inject, in order to drive the system toward a desired gas state.

According to an embodiment of the present invention applicants propose to create a simple mathematical framework for understanding the need for and results of an inject upon performance behavior in a two chambered system, e.g., a MOPA or MOPO system. At the heart of an embodiment of the present invention is the utilization of, e.g., a multi-dimensional geometric (state-space) interpretation of the gas state of the laser and the need for and amount(s) of injection(s) required. Applicants have chosen to call this the "Wheel of Fluorine," which is indicated at 10 in FIG. 2. The zones 10a–i, of the wheel 10 provide guidance as to what the gas state currently is in both the MO and the PA, relative to the desired target gas state MOGood, PAGood state 10a, not surprisingly the center of the bull's-eye formed by the wheel 10.

The rings 11, 12, including zones 10b–e in the inner ring 11 and 10f–i in the outer ring 12, of the wheel are determined by configurable parameters, and the gas state is evaluated prior to each inject.

To address the two flaws listed above, at least two new mechanisms+have been added to existing F$_2$ monitoring and control. The first is a look-up table indexed by duty cycle, as shown in Table I. Table I has a set of bins/columns (five), with each bin/column containing three values, a reference MO energy, a reference voltage, and an inject frequency. The four internal bin boundaries, duty cycle, Emo, HV and inject frequency are Configurables and can be set empirically and may even vary over laser system life and even individually for each chamber operating life, and Table I contains representative values.

TABLE I

| Duty Cycle (%) | 0–15 | 16–25 | 26–45 | 46–60 | 61–100 |
|---|---|---|---|---|---|
| MO Energy (mJ) ref | 0.95 | 1.01 | 1.07 | 1.15 | 1.2 |
| Voltage (V) ref | 960 | 940 | 925 | 910 | 900 |
| Inject Frequency (%) | 5 | 10 | 20 | 30 | 35 |

The first two values Emo and HV can be used, e.g., just prior to each inject, e.g., to determine where the laser is on the Gas State diagram 10, as discussed in more detail below, i.e., the zone 10a in which the laser is operating. The third value is used, e.g., to determine the update frequency (or freshness) of the information in the bins. This can be used, e.g., to determine how the bin values are adapted over time and operating life. Table I replaces, e.g., voltage accounting methods used, e.g., in the applicants'employer's 5000 to 7000 laser products. The MO energy and voltage reference values in each duty cycle bin can provide. e.g., gas mix "anchors" which only slowly change as chamber(s) ages.

The Gas State diagram 10 can provides, e.g., a map of the pre-inject operating condition of the laser relative to a target condition provided by the reference MO energy and voltage Table 1 above.

By comparing the measured values of Emo and burst average voltage ("BAV") referred to herein as HV, just prior to starting an inject with the target values from the table, selected, e.g., by the current duty cycle, e.g., the current gas condition can be determined. For example, the combination of a moderately elevated MO energy and voltage relative to the reference values, i.e., within zone 10b, would indicate a state of MO OK, PA Lean. This indicates the need for a boost injection only in the PA chamber. A set of configurables can be used, e.g., to geometrically determine the size of the center target ring 10a, i.e., no boost indicated, the middle ring 11, single chamber boost needed—MO or PA, and the outer ring 12, dual chamber boost needed—both MO and PA. Both positive and negative boosts are allowed.

Table I lists for the five bin boundaries, 0–15, 16–25, 26–45, 46–60 and 61–100, 5 respective reference MO energies, and 5 respective reference voltages which can, e.g., all be configurables. The 5 inject frequencies, can, e.g., be diagnostics, which can, e.g., vary based upon actual operating conditions. Additional configurables may be required to provide flexibility in setting the geometry of the Gas State diagram 10. In the utilization of this gas monitoring and control system, e.g., all of the following computations are done upon successful entry to an $F_2$ inject state.

First the duty cycle at the time of the inject is computed according to the formula:

$$DC(\%) = 100 \times \frac{BurstLength}{\left(\frac{BurstLength}{RepRate} + BurstInterval\right) \times 4000}$$

where Burst Length is the number of pulses in a burst, Burst Interval is the time between bursts, Rep Rate is the laser burst repetition rate, and 4000 is the pulse repetition rate within a burst, e.g. in a 4 KHz repetition rate laser, and which may change from laser to laser according to its designed pulse repetition rate. For example the DC may be calculated periodically, e.g., every 30 seconds and, e.g., the most recent calculation may be used each time.

From this, e.g., the appropriate duty cycle bin from Table I above can be selected and, e.g., a reference Emo_ref and HVref read from the appropriate bin. These two values, along with the current values of Emo and HV, computed as the (BAV) can, e.g., be utilized to compute a pair of scaled errors:

$$\bar{E}_{MO_{inner}} = \frac{E_{MO_{current}} - E_{MO_{ref}}}{\Delta E_{MO_{inner}}} \quad \bar{E}_{MO_{outer}} = \frac{E_{MO_{current}} - E_{MO_{ref}}}{\Delta E_{MO_{outer}}}$$

$$\bar{V}_{inner} = \frac{V_{current} - V_{ref}}{\Delta V_{inner}} \quad \bar{V}_{outer} = \frac{V_{current} - V_{ref}}{\Delta V_{outer}}$$

The left, "inner" column above, can, e.g., define the boundary of the inner ring 10a region in the Gas State diagram 10, between the no boost ring 10a region, and single chamber boost 11 region. The right "outer" column can, e.g., define the boundary of the outer ring, between the middle ring 11-region one chamber boost region and the dual chamber boost region of ring 12. The two ΔV's and two ΔE's that provide the scaling for the 3 gas state regions 10a, 11 and 12 are also configurables, and may be determined empirically. In other words, the distance from the center of the multivariable gas state space coordinate system 10 for any given target (defined by the particular bin) and the outer boundary of the inner target region 10a, is a selected $\Delta Emo_{inner}$ or a selected $\Delta V_{inner}$ and the distance from the center of the multivariable gas state space coordinate system 10 for any given target (defined by the particular bin) and the outer boundary of the middle ring region 11, in the example of the preferred embodiment, is some selected $\Delta Emo_{outer}$ and some selected $\Delta V_{outer}$, which are configurables and can be selected periodically, e.g., selected empirically by experimentation, as discussed further below.

The next step according to the illustrated embodiment of the present invention can be, e.g., to determine in which region in the diagram 10 the laser is currently operating. First, e.g., a computation may be made of the radial distance from the center scaled by the inner ring and the outer ring:

$$R_{inner} = \sqrt{(\bar{E}_{MO_{inner}})^2 + (\bar{V}_{inner})^2} \quad R_{outer} = \sqrt{(\bar{E}_{MO_{outer}})^2 + (\bar{V}_{outer})^2}$$

There are, e.g., then three cases to consider:
1. ($R_{inner}$<1), i.e., within the center circle region 10a, where no boost is necessary. In the event this is the case, then, e.g., the next two considerations may be skipped.
2. ($R_{inner}$>1) & ($R_{outer}$<1), i.e., in the middle region 11, where a single chamber boost is necessary. In the event that this is the case, then, e.g., the process may be to compute an angle to determine which quadrant in the state space the operating point is in, e.g., ∠R=a tan2($\bar{V}_{inner}, \bar{E}_{MO_{inner}}$), from −π to +π, and to represent a boost state by a pair, i.e., MO Boost, PA Boost, where the boost value can be, e.g., one of (−1, 0, +1). The process can then be, e.g., to determine which of four possible cases is true, i.e.:

i. $\frac{\pi}{2} > \angle R > 0$:      1st quadrant 10b [0, +1]

ii. $\pi > \angle R > \frac{\pi}{2}$:      2nd quadrant 10e [+1, 0]

iii. $-\frac{\pi}{2} > \angle R > -\pi$:      3rd quadrant 10d [0, −1]

iv. $0 > \angle R > -\frac{\pi}{2}$:      4th quadrant 10c [−1, 0]

In this notation, [0,+1] for quadrant 10b means that the MO is okay and the PA is lean, i.e., 0 change for the MO and an inject+1 for the PA; [+1,0], e.g., region 10d, means that the MO is lean and the PA is Okay, i.e., MO with +1 needs an injection and the PA at 0 needs none; [0,−1] for quadrant 10d means that the MO (0) is okay and the PA (−1) is rich; and [−1,0] for quadrant 10c means that the MO (−1) is rich and the PA (0) is okay.

3. ($R_{outer} > 1$), i.e., the outer ring 12 region applies, which can mean, e.g., boosts are required to both chambers, in which event, e.g., the process may be to compute an angle to determine which quadrant of the two dimensional state space the operating point is in, by $\angle R = a\tan2(\overline{V}_{outer}, \overline{E}_{MO_{outer}})$, from −π to +π, and to represent the boost state, e.g., by a pair, e.g., MO Boost, PA Boost, where the boost value can be one of (−1, 0, +1), and then, e.g., to determine which of four possible cases is true for the rotated quadrants (45° relative to the quadrants considered above relating to the inner ring 11 region):

v. $\frac{\pi}{4} > \angle R > -\frac{\pi}{4}$ :    1st quadrant 10h [−1, +1]

vi. $\frac{3\pi}{4} > \angle R > \frac{\pi}{4}$ :    2nd quadrant 10i [+1, +1]

vii. $-\frac{\pi}{4} > \angle R > -\frac{3\pi}{4}$ :    3rd quadrant 10g [−1, −1]

viii. Otherwise :    4th quadrant 10f [+1, −1]

Again, as above, in the quadrant 10h the MO is rich (−1) and the PA is lean (+1); quadrant 10i, the MO is lean (+1) and the PA is lean (+1); quadrant 10g the MO is rich (−1) and the PA is rich (−1); and quadrant 10f the MO is lean (+1) and the PA is rich (−1).

It will be seen that for each of the outer quadrants, e.g., quadrant 10h, the half of the quadrant that makes each MO and PA pair in the region 10h corresponds to the part of the pair that was not okay in the adjacent middle ring 11 region, i.e., region 10h is MO rich and PA lean and middle region 10e is MO rich PA okay and region 10b is MO okay and PA lean.

Once the relative gas state region has been determined, e.g., the process can be to determine the MO and PA inject sizes, which can be, e.g., computed as a combination of nominal nominal inject size and a boost (assuming PA is the fixed inject size chamber in this example), e.g.:

MO Inject Size=MOF2consumed+[MO Boost State]×[MO Boost Size]

PA Inject Size=PAnominalInject+[PA Boost State]×[PA Boost Size]

It is possible according to an embodiment of the present invention to determine the MOF2 consumed from the current ACR and the shot count. With the ACR being a configurable laser to laser at start of life and varying over life according to updating, e.g., as discussed below. It is also possible to determine MOF2 consumed by other methods, e.g., real time $F_2$ measurements. The PanominalInject can also be, e.g., a configurable determined empirically and variable over time.

The MO and PA Boost Sizes can both be in units of kPa. This replaces previously used boost logic, which used a combination of voltage rise above reference and inject sensitivity to try to compute the amount of, e.g., PA inject to return to a target operating voltage.

The MO and PA Active Consumption Rates (ACR's) can be updated using the same boost state logic, e.g.:

MO ACR[new]=MO ACR[old]+[MO Boost State]×[ΔACR increment]

PA ACR[new]=PA ACR[old]+[PA Boost State]×[ΔACR increment]

A preferred embodiment of the present invention also contemplates, e.g., changing an adaptation mechanism for determining the reference values of Emo and HV as a function of the duty cycle discussed above. Experience has suggested to applicants that the majority of injects are performed at high duty cycle, since the active consumption component can dominate total fluorine consumption. For this reason, the duty cycle bin that contains the highest active duty cycle (e.g., 61–100) for a given laser will likely be used most often for injections. There can also be some bins that rarely, if ever, are used for injections. This can lead to stale information in these bins. The following mechanism, according to an embodiment of the present invention, is designed, e.g., to address this operational reality.

First, according to an aspect of an embodiment of the present invention, it is proposed to update the bin hit frequency, which is tracked in the bottom row of Table I. Each time an inject is initiated, the current bin is determined. The count in all bins is then modified as follows:

1. Inject_frequency[i, current bin]=(100−Kf)/100×Inject_frequency[i−1, current bin]+Kf
2. Inject_frequency[i, all other bins]=(100−Kf)/100×Inject_frequency[i−1, all other bins]

In this way, the frequency (% of injects) of the last (100/Kf) injects is tracked for use in the following adaptation step.

Next, e.g., it is contemplated to compute the current error between the target Emo and HV and the actual Emo and HV, using the reference values from the appropriate bin:

Eerror=Ecurrent−Eref

Verror=Vurrent−Vref

These two error terms can then be used as the numerators used in the inner and outer radius calculations noted above. The following adaptation step can, e.g., only be performed if $R_{outer} < 1$, i.e., in the 10a ring or 11 ring regions. This can, e.g., prevent a bad cycle from corrupting the reference values that anchor the system to producing a rational gas mix.

If the error is within bounds, then, e.g., the process can be to determine which of the following two cases apply, and respond accordingly:

1. The current change is in the "highest-frequency" bin, e.g., the 46–60 bin because that is the most commonly seen duty cycle:
   The process can then be, e.g., to update the reference values in all bins according to the following:
   a. Eref[i, every DC bin]=Eref[i−1, every DC]+Kr×Eerror
   b. Vref[i, every DC bin]=Vref[i−1, every DC]+Kr×Verror
2. the injection is using any bin other than the highest frequency bin, in which event the process can be, e.g., to update only the current bin according to the following:
   a. Eref[i, current DC only]=Eref[i−1, current DC]+Kr×Eerror
   b. Vref[i, current DC only]=Vref[i−1, current DC]+Kr×Verror According to an embodiment of the present invention, e.g., this can serve two purposes. First, the high-frequency bin is used to set the absolute level for all of the other bins. This has benefits, e.g., as chambers age, the reference voltage in the high-frequency bin will naturally rise, and it will carry all the other bins with it. Additionally, the lower frequency bins will effectively be adjusted relative to the high-frequency bin each time they are used for an injection of gas. This allows, e.g., the shape of the HV vs. DC curve to change with time.

One additional conditional check can be imposed on the adaptation process just discussed. Since, e.g., the very first inject is usually biased by the "refill effect," adaptation could, e.g., be performed only starting at the $M^{th}$ inject, beyond the first, where M can also be a configurable. Also, because there is a higher confidence in the gas mix early in the gas life, this adaptation process could, e.g., only be performed for the first N injects, where N can also be a configurable. These two conditions reduce to:

If (this_inject>=M) & (this_inject<=N)) {Do Adaptation};

Else {Skip Adaptation};

The inject count could, e.g., be incremented at the start of each inject, and should be consistent for the entire inject.

According to an embodiment of the present invention, the previously employed voltage accounting logic has been replaced by the DC-indexed table of Table I, and Wheel o' Fluorine Gas State diagram 10 discussed above. Therefore, it may no longer be necessary to track voltage changes due to duty cycle changes. Voltage accounting, however, should still be performed, because the time spent in NewOpPoint can provide a useful injection hold-off period following a duty cycle change, and the voltage and MO energy rise may still provide some valuable information. The result of voltage accounting, however, is, according to an embodiment of the present invention no longer used to update the reference voltage, which is handled by using Table I.

However, the DC-indexed table of Table I may not be used, e.g., to handle energy set point changes, which may cause changes in burst average voltage proportional to the current value of dV/dEtarget. Assuming a typical dV/dEtarget value of 20V/mJ, a 2 mJ energy target change will result in a 40V change in burst average voltage. A similar effect may be seen in Emo, and dEmo/dEtarget must also be tracked. To handle this effect, NewOpPoint state must be modified to track the approximate value of dV/dEtarget (and dE/dEmo), as follows according to an embodiment of the present invention:

1. Upon detection of an energy set point change, the process can be, e.g., to enter NewOpPoint, by latching the previous Etarget, Emo, and BAV (Etarget[entry], Emo[entry], and BAV[entry])

2. After waiting an appropriate number of pulses, e.g., 100K, depending on DC, (which maybe determined empirically and may even not change at all and be, e.g., 1000,000), then latch the new Etarget, Emo and BAV (Etarget[exit], Emo[exit], and BAV[exit]).

Thereafter the process can be, e.g., to compute the approximate value of dEtarget, dEmo and dV as:

i. dEtarget[current]=(Etarget[exit]−Etarget[entry])
ii. dEmo[current]=(Emo[exit]−Emo[entry])
iii. dV[current]=(BAV[exit]−BAV[entry])

Then, e.g., if |dEtarget|>0.1), compute the two ratios and update the running estimates by:

1. dV_dEtarget[current]=dV[current]/dEtarget[current]
2. Emo_dEtarget[current]=dEmo[current]/dEtarget[current]

Then, e.g., update running estimates of dV/dE and dEmo/dE by:

1. dV_dEtarget_dV[i]=(1−Kd)×dV_dEtarget[i−1]+Kd×dV_dEtarget[current]
2. dEmo_dEtarget_dV[i]=(1−Kd)×dEmo_dEtarget[i−1]+Kd×dEmo_dEtarget[current]

Else, perform no updates

This can be done, e.g., to account for a change in a configurable, e.g., duty cycle or energy set point (average energy). It may also happen, e.g., after a new gas fill.

The system cannot always rely on an energy control system estimate of dV/dE being available, since some end users of the laser light, e.g., for microlithography may use external energy control. For this value it is only necessary to provide a ballpark estimate of dV/dE. These two values can then, e.g., be used to adjust the current values of Emo and BAV, e.g., upon injection, e.g., by converting these values back to their equivalent values at 10 mJ. Just prior to computing the scaled Emo and Hv used in the inner and outer radius calculations, according to an embodiment of the present invention, Emo and HV may be scaled as follows:

1. Emo[current]=Emo[current]−(Etarget−10)×dEmo/dEtarget

2. V[current]=V[current]−(Etarget−10)×dV/dEtarget

It can be seen that for the nominal case of 10 mJ output energy, the correction term will be zero and have no impact on the inject algorithm. This may then account for users operating at other than the nominal 10 mJ.

Figure 3:
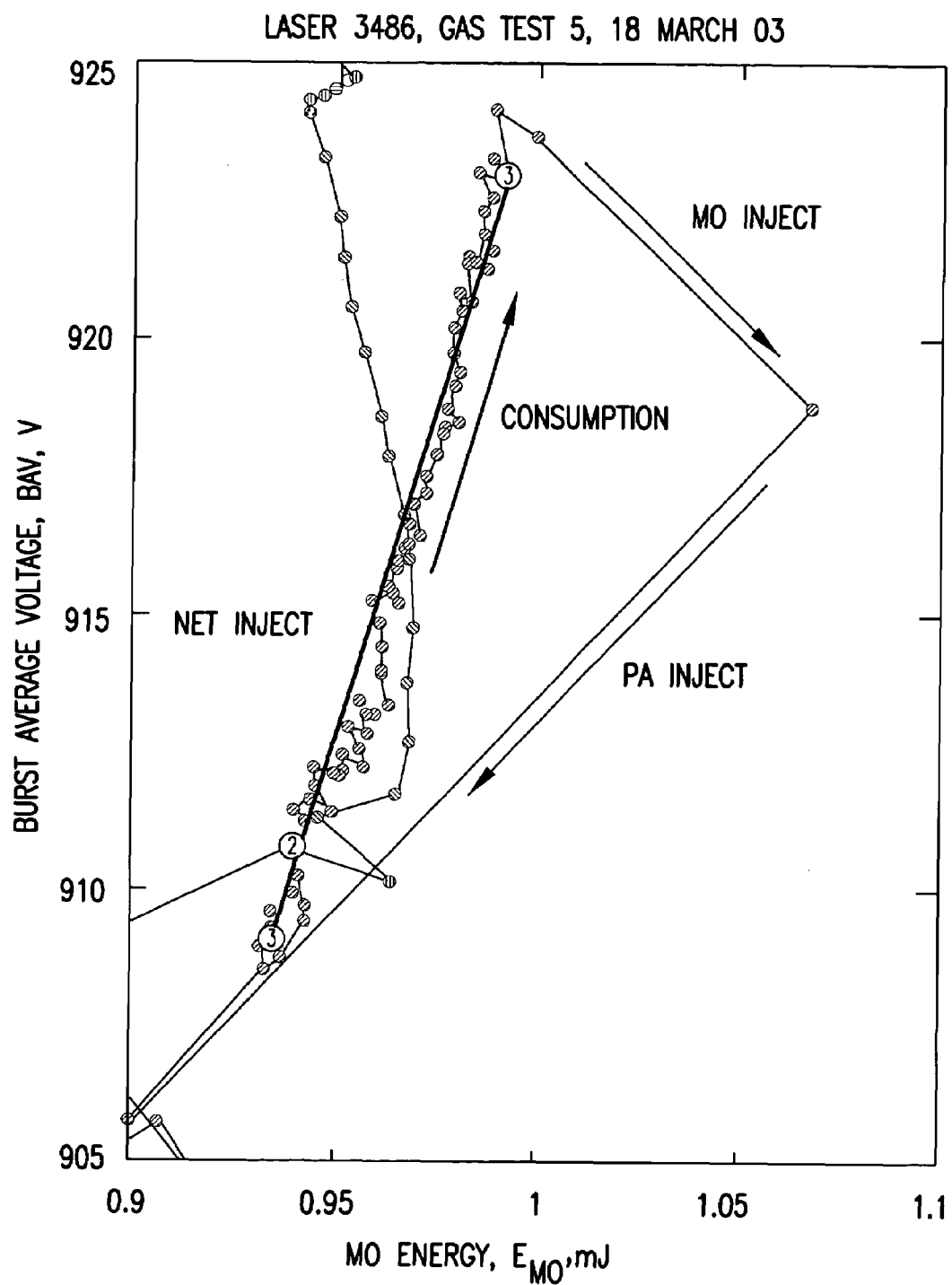
FIG. 3 shows the tracking of an operation of a two-chamber laser system in the multidimensional state space according to an embodiment of the present invention.

In operation then the system may, e.g., be operated with nominal injects of, e.g., 1.5 kPa, e.g., of $F_2$ (contained within_kPa of a nobel gas, e.g., neon), with boosts of, e.g., 0.5 kPa, multiplied by −1, 0 or +1. As shown in FIG. 3, the total $F_2$ injected, weighted by chamber—MO or PA, determines the magnitude of the injection. The net injection vector is determined by the ratio of the size of the MO injection and the PA injection, and if either is zero than the injection occurs on the PA lean to PA rich axis in FIG. 2 or the MO lean to MO rich axis in FIG. 2 respectively. The system may not have equal injection nominal unit sizes, so that a unit injection of, e.g., 1.5 kPa for the PA may correlate to a 1.0 Kpa for the MO, as shown e.g., in FIG. 4.

Figure 4:
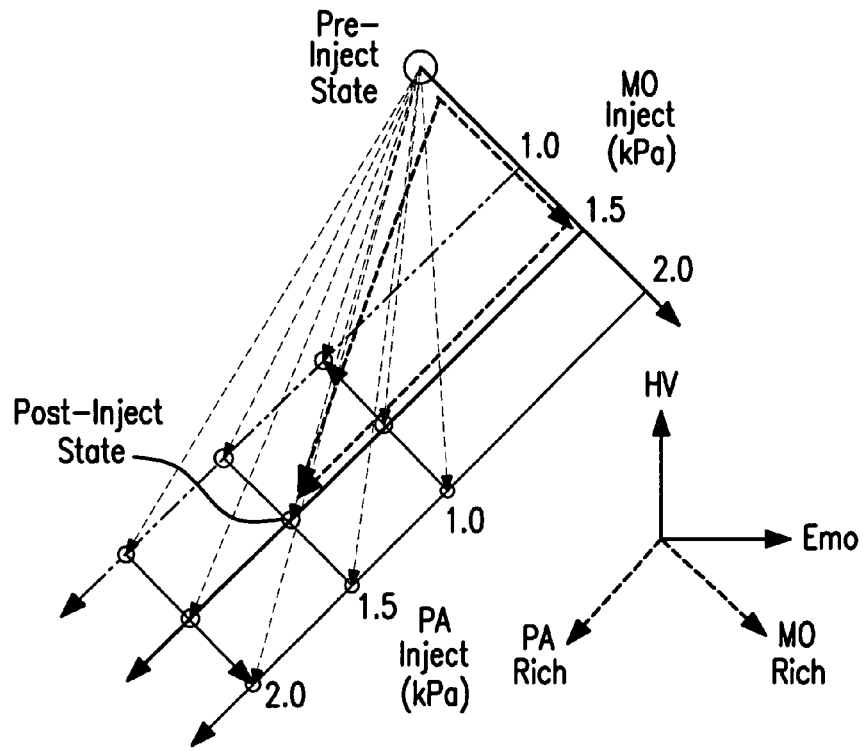
FIG. 4 shows respective changes to gas mixture in respective ones of the multiple chambers according to an embodiment of the present invention.
Figure 4A:
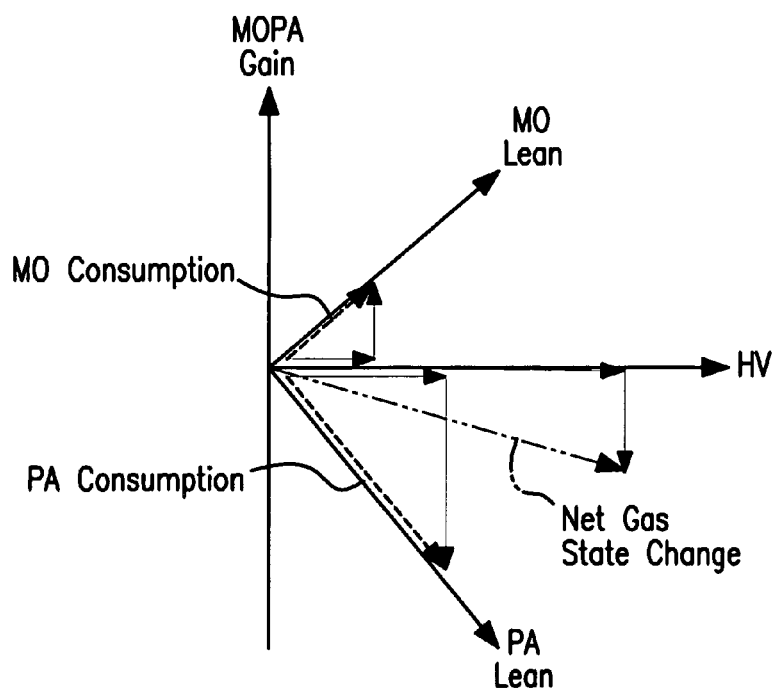
FIG. 4a shows the respective changes imposed upon the multidimensional state space according to an embodiment of the present invention.

FIG. 4a shows respective changes imposed upon the multidimensional state space according to an embodiment of the present invention similar to those shown in FIG. 4. In this Figure, which is given for illustrative purposes only and is not to scale, i.e., e.g., the net gas state change should be a vector sum of the MO consumption and PA consumption and the HV component of the net gas state change should equal the MO and PA HV components to the net change vector.

From FIG. 3 it can be seen that a previous inject brought the laser gas mixture to an operating state at or about the target, e.g., the circled 2 in FIG. 3. Gas consumption over time indicated by the dots extending toward the circled 3 in the upper center of the chart of FIG. 3, i.e., with increasing voltage (BAV) and increasing Emo, until the control system determined, e.g., by shot count, that an injection is due. The system, as noted above, computes the current location of the gas mixture in the multi-dimensional state space and determines, e.g., that the state is in the outer ring 12 at, e.g., 10, MO lean, PA lean (+1,+1) so that the MO and the PA both get the normal inject and in addition a +1 boost. The MO injection from a point on the MO lean, MO rich axis of FIG. 2 where the MO is lean toward the target of MO good (10a) is in the direction shown in FIG. 3, and as noted above may be scaled smaller than the PA inject plus boost. In addition, the PA inject along the PA lean, PA rich axis in FIG. 2, from the direction of PA lean toward the target 10a, PA good, is in the direction shown in FIG. 3. The net injection vector moves the operating point toward the circled 3 in the lower left of the chart of FIG. 3.

Due to some operating requirements in the field, e.g., end users of the laser light for micro-lithography not allowing what are called "fire through injects," certain kinds of data, e.g., at the "corner" between MO and PA injections (i.e., where the MO injection has been completed, but the injection upcoming for the PA for the same injection has not yet occurred) are not available, making the use of the net injection vector (magnitude and angle), e.g., as shown in FIG. 3, possible of determination in all cases and therefore quite useful. Thus by monitoring the laser through the inject cycles, even if the exact MO and PA injections are not always determinable, the net is. It has been found that repeatability of net injections is uncertain, e.g., due to metrology errors and other inaccuracies. However, the ability to predict both the magnitude and angle of the net change vector allows for the development of an algorithm that attempts to reach an exact gas space-state target with each injection.

Also as seen from the above, in operation, e.g., the $F_2$ injection algorithm can be based on adaptively tracking an Active Consumption Rate (ACR) of each chamber of the laser system—MO and PA. The ACR is the $F_2$ consumption rate, e.g., in kPa/Mshot, due to the number of shots having been fired, i.e., gas discharges resulting in an output laser light pulse in beam form, usually as part of a burst of pulses with some interval between bursts. ACR can vary, e.g., usually slowly with gas mix, chamber age, and duty cycle. Accurate ACR determinations can allow for purely shot based injections. An adaptation mechanism can rely on tracking the dual-chamber gas space-state of the laser, e.g., at different duty cycles. The gas space state on a multidimensional state-space coordinate system, e.g., the two dimensional Emo (mJ) v. HV (V), can be utilized to provide information about the coupling between the gas mix in each chamber, MO and PA.

Efficiency changes due to operation at different duty cycles can be handled, e.g., by a series of gas state target regions, i.e., the "wheels," i.e., ring regions 10a, 11 and 12 shown in FIG. 2. The duty cycle at the time of an injection can be used to determine which wheel/ring to compare the current measured gas state-space operating point against. "Boost logic" can be used to determine whether to perform a nominal inject to each chamber or to provide a positive or negative boost to one or both chambers.

There are two primary mechanisms for fluorine consumption in a laser system such as are under consideration in regard to embodiments of the present invention, active consumption [kPa/Mshot] due to shots fired, whereby, e.g., fluorine reacts with electrode material during discharge, and forms compounds that, e.g., coat the electrodes or drift around in the laser gas until removed, e.g., by a filter, and passive consumption [kPa/hour], e.g., due to elapsed time, during which, e.g., fluorine reacts slowly with chamber walls, gas lines, imperfect seals, etc., whether shots are being fired at the time or not. If the Active Consumption Rate (ACR) and Passive Consumption Rate (PCR) were known exactly for each chamber, one could simply count shots and time to determine how much $F_2$ has been consumed since the last injection. However, this is not the case. ACR varies, primarily with chamber age and voltage, so this value must be estimated from recent measurements. As the laser is operated, e.g., a running estimate may be made of the amount of $F_2$ consumed in each chamber, as is well known in the art, based upon current ACR and shot count and also time elapsed involved with the PCR.

A consumption target may be set, e.g., for one of the chambers (e.g., the PA by default) which may be equal to a nominal inject size, e.g., if the nominal inject size is 1.2 kPa, then the PA consumption target can be set to 1.2 kPa. When, e.g., the estimated PA consumption amount exceeds the target, an inject may be requested by the system controller (not shown).

The estimated amount of $F_2$ consumed by the other chamber (MO) may also be used to set the inject size for that chamber. For example, if the MO chamber consumes 1.35 kPa for every 1.2 kPa consumed by PA, e.g., the nominal MO inject could then be set to 1.35 at the time of the injection. This function of the controller is not modified according to the disclosed preferred embodiments of the present invention, and the present invention relates to supplementing this controller function of determining when and how much to make as nominal injections. Utilizing, e.g., adaptive determination of the ACR's for the chambers, MO and PA, e.g., can, in part, enable this supplementation. This can avoid, e.g., the need to assume the knowledge of the actual ACR for each chamber, which currently cannot be measured directly. An ACR can, according to embodiments of the present invention be inferred, e.g., from the laser gas state-space of the current operating point in the gas state-space 10, e.g., a combination of average Emo and HV (BAV), e.g., by noting where the state-space is from one inject to the next. The relative change of ACR is what matters, so ACR is adaptive, increased or decreased, depending on whether the voltage at the time of inject is higher or lower than a certain reference voltage, which reference voltage is also adapted on the basis of difference to actual voltage, e.g., at a higher time reference determination than the ACR. Therefore once the voltage reference has converged, the ACR will not change or will change very slowly, e.g, based on slowly changing passivation changes.

A separate consumption rate can be estimated for each chamber, e.g., using the following:

$$[F_2]_{consumed} = \frac{(\text{shots since inject})}{1,000,000} \times \left(ACR \frac{[kPa]}{Mshot}\right) +$$

$$(\text{hours since inject}) \times \left(PCR \frac{[kPa]}{hour}\right)$$

which may also be estimated from recent values calculated, sich it varies but slowly over time with chamber age and voltage.

Consumption results in increased average voltage to deliver the same output energy, e.g., from the PA, and consumption may also result in either increased, $$\Delta E_{MO} = \left(\frac{\partial E_{MO}}{\partial [F_2]}\right)\Delta[F_2] + \left(\frac{\partial E_{MO}}{\partial V}\right)\Delta V$$

deceased, or unchanged MO energy, depending on the relative size of the partial derivatives in the following equation:

It is not necessary to know the value of these partial derivatives, just the direction that they shift the gas state-space operating point. The "Wheel of Fluorine" provides a simple graphical interpretation of this change in the gas state-space operating point. From the plot of the gas state-space operating point, e.g. in a gas state-space defined by the coordinates x=$E_{MO}$, y=HV, e.g., as shown in FIGS. 2 and 3, along with another set of axes in the gas state-space, e.g., rotated approximately 45°, which represent chamber consumption/injection, e.g., Lean/Rich axes, i.e., as the MO uses $F_2$ the state space operating point travels outward from the center of the coordinate system, 10a in FIG. 2, toward MO Lean. One can follow, e.g., as $F_2$ is consumed in the MO chamber, this travel along the axis in the "MO Lean" direction.

Similarly a PA chamber injection, moves the gas state space operating point for the PA in the "PA Rich" direction along the PA axis orthogonal to the MO gas state axis as shown in FIG. 2. Typical consumption usually causes both MO and PA to get leaner, i.e., the gas state-space points for each moves in the HV High direction as shown in FIG. 2. A higher voltage than desired or targeted is indicated as being needed to maintain output power in the output of the PA and also in the output of the MO. A typical injection usually causes both MO and PA to get richer, i.e., the gas state-space operating point for each chamber moves in the HV Low direction on the HV High HV Low axis as shown in FIG. 3.

The Wheel of Fluorine 10 can be thought of as a sort of "compass" which can indicate which direction the gas state will go for a given change in gas mix and also which direction it needs to go from the current operating point to get to or near a selected target, e.g., 10a in FIG. 2. The system and method according to an embodiment of the present invention employs laser operating data, e.g., gas consumption and the injection cycle. The Wheel of Fluorine "target" can provide, e.g., necessary information useful in adjusting the ACR estimate. Injection is attempted in an amount matching the consumption believed to have occurred since the last injection. That is, e.g., a 1.2 kPa inject when the estimate is that consumption was 1.2 kPa. If, however, e.g., the PA ACR estimate is too low, i.e., the PA chamber is consuming $F_2$ at a higher rate than estimate, there will, at least over time, result a gas state in the PA of "PA Lean," moving the gas state operating point outward on the PA axis in the direction of "PA Lean" relative to the target region 10, e.g., point 4c shown in FIG. 5.

Figure 5:
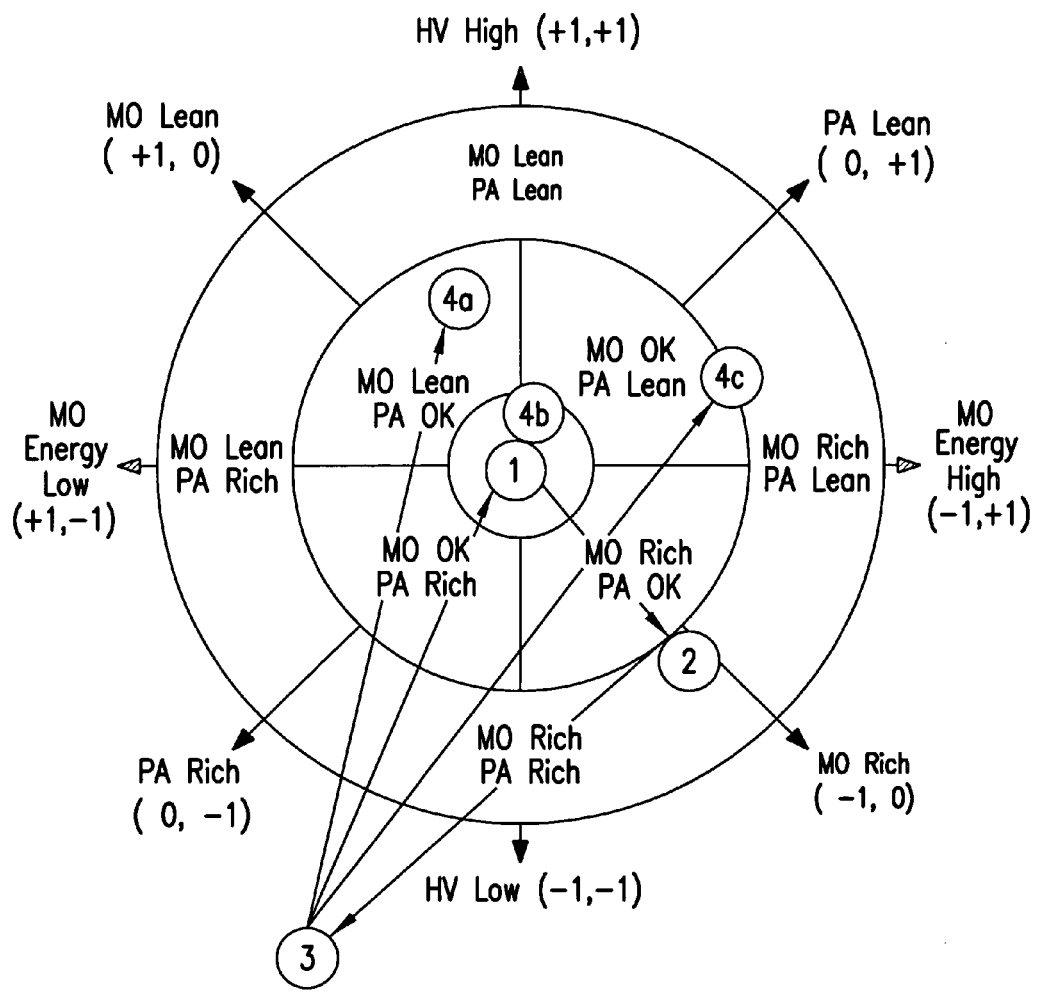
FIG. 5 shows schematically a utilization of the multidimensional state space according to an embodiment of the present invention.

The Wheel of Fluorine can also be used as a "target":

1. Assuming that the injection/consumption cycle is repeatable, it should be possible, e.g., able to follow a loop around repeatedly in Gas State space 10 as follows:
   a. starting at a gas state 1 in a circle indicated in FIG. 5, i.e., at the target MO good, Pa good, the controller can, e.g., perform an MO inject, which, e.g., puts the system gas state 2 in the circle as shown in FIG. 5, and then, e.g., follow this with a PA inject to get to state 3 in a circle shown in FIG. 5;
   b. bs the laser fires, the gas state will move in the "Lean" direction for both chambers, but could wind up at 4a, 4b or 4c as shown in the circles in FIG. 5, (or anywhere else)
   c. if the ACR estimates were correct, after an injection, the system should have arrived at the target in 10a, i.e., the point indicated by 1 in a circle in FIG. 5;

The Wheel of Fluorine "target," e.g., provides the necessary information to adjust the system ACR estimate, e.g., as follows:
   a. by definition, the system can, e.g., try to inject as much as the system believes has been consumed, e.g., since the last inject, i.e., a 1.2 kPa inject when the estimate is that is what was consumed, i.e., to point 4b;
   b. if, for example, the PA ACR estimate is too low i.e., the PA chamber is consuming F2 at a higher rate than the estimate, basing the injection only on the estimate from the ACR will result in the gas mix winding up in the "PA Lean" direction relative to our target, e.g., at 4c in a circle as indicated in FIG. 5, at the next requested injection, rather than back where the system started the cycle.
   c. similarly, the gas mixture could end up in the state space 10 at points 4a, e.g., if the MO ACR estimate is low and the PA estimate is okay.
   d. The algorithm according to an embodiment of the present invention can then compensate for error by, e.g., increasing the PA ACR estimate if the state arrived at is 4c, i.e., to get closer to the center 10a on the next cycle, e.g., performing a positive "boost" injection to the PA chamber, e.g., to compensate for the overshoot on this cycle. That is, at a next inject request the system, e.g., employing the algorithms noted above, will compensate for by increasing the PA ACR estimate (or MO estimate, or both, as appropriate, by, e.g., adding the "boost" to the injection (or decreasing the injection according to a negative "boost" if such is indicated) to get closer to the center on the next cycle, based upon, e.g., the computed overshoot on the last cycle.

Because the laser is more efficient, i.e., lower HV is required to deliver the same output energy, at high duty cycles than at low duty cycles, one could fore to see different pre-inject gas states, i.e., target center regions 10a at different duty cycles according to an embodiment of the present invention, the duty cycle (DC) operating space is divided up into five bins, each with its own target center, i.e., in the illustrative example, Emo and HV, with, in the example, default bins (% DC): [0->15, 16->25, 26->45, 46->60, 61->100. When an inject is requested, therefore, the current DC is used to select the appropriate bin, and that bin's stored Emo and HV are used as the Wheel of Fluorine target center to determine whether any ACR adjustments or boosts are necessary. These bin values, in turn, are slowly adapted, essentially low pass filtering, to allow for increases in nominal HV as the chambers age.

Figure 6:
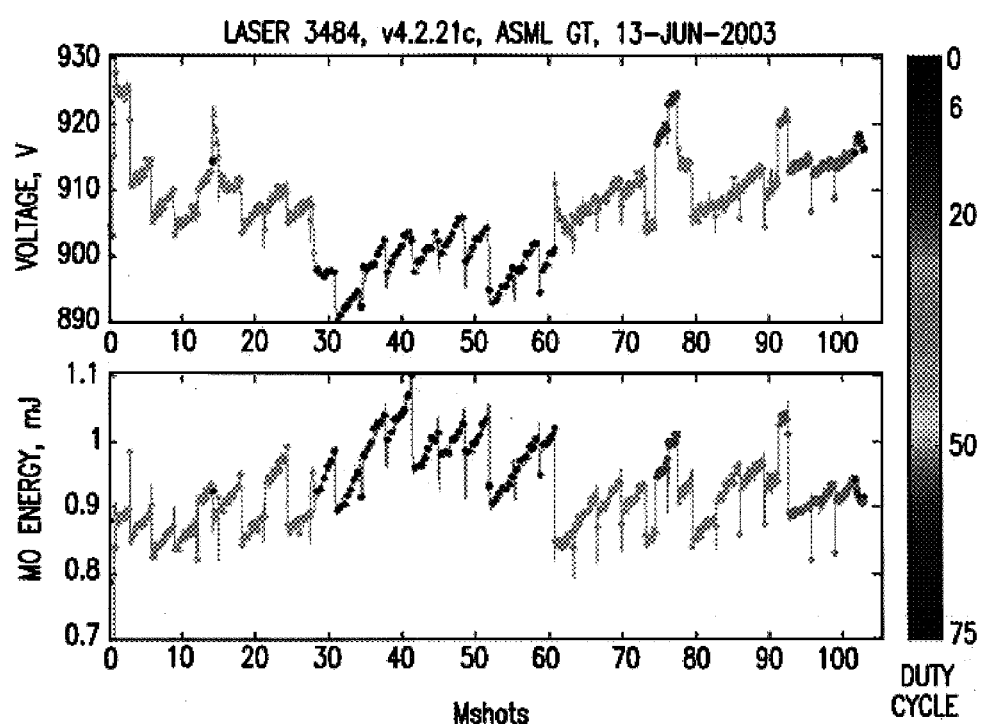
FIG. 6 shows operation of a multi-chambered gas discharge laser system with gas mixture modification according to an embodiment of the present invention.

FIG. 6 shows the results of a routine gas test over about 1 B pulses. The plot is of Emo and HV vs. Shot Count. The data point markers between about 0 and 0.3B shots and between about 0.6B and 0.9B shots (excepting those at about 0.75B to 0.8B shots) are a one-duty cycle, e.g., 38%. The data point markers between about 0.3B and 0.6B are at another duty cycle, e.g., 75%. The data point markers between about 0.75B and 0.8B and between about 0.9B and 1.0B are at a third duty cycle, e.g., about 25%. It can be seen from FIG. 6 that each of the duty cycle groupings tend to stay within a defined band of both Emo and V, e.g., for the 38% duty cycle between about 905–915 volts and about 0.83–0.98 Emo, and for the 75% duty cycle groups between about 890–905 volts and about 0.88–1.3 Emo, and the about 25% duty cycle between about 910–923 volts and about 0.88 and 0.98 Emo, with some variations outside of these general bands.

Figure 7:
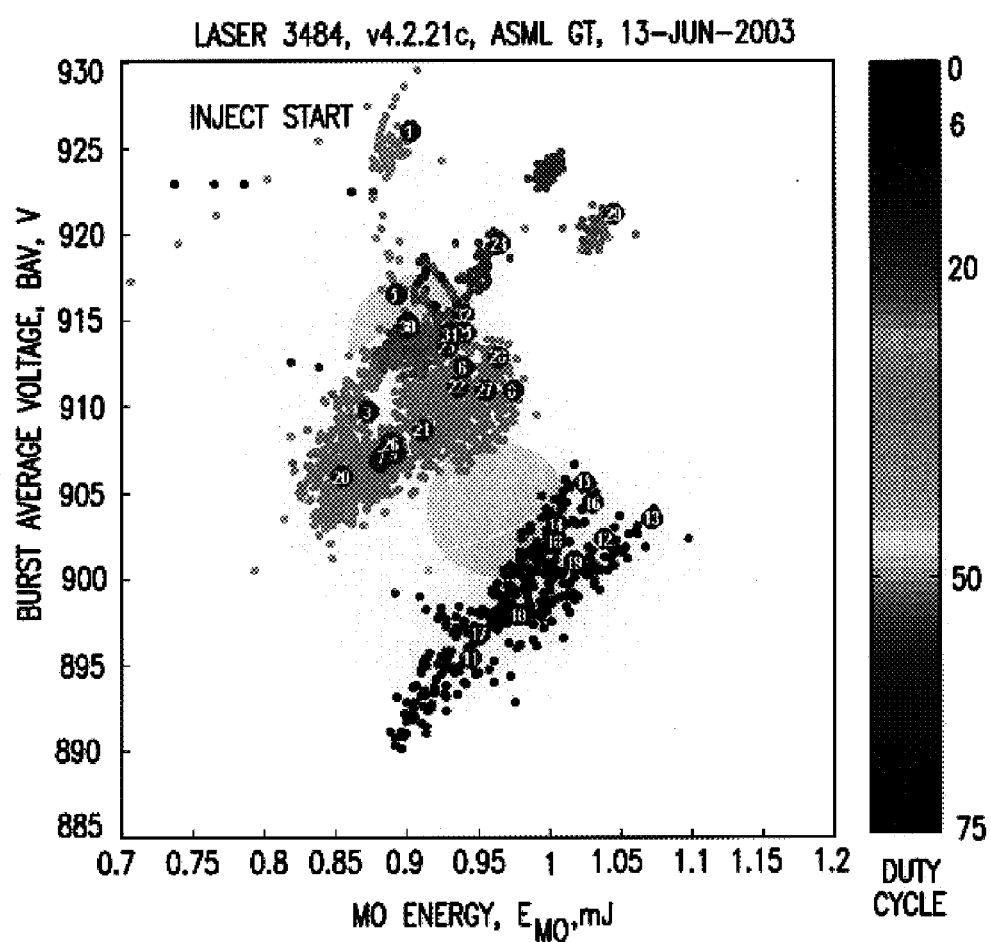
FIG. 7 shows graphically the modification of gas mixtures in multi-chambered gas discharge lasers operating at differing duty cycles and having different multidimensional state spaces according to duty cycle according to an embodiment of the present invention.
Figure 8:
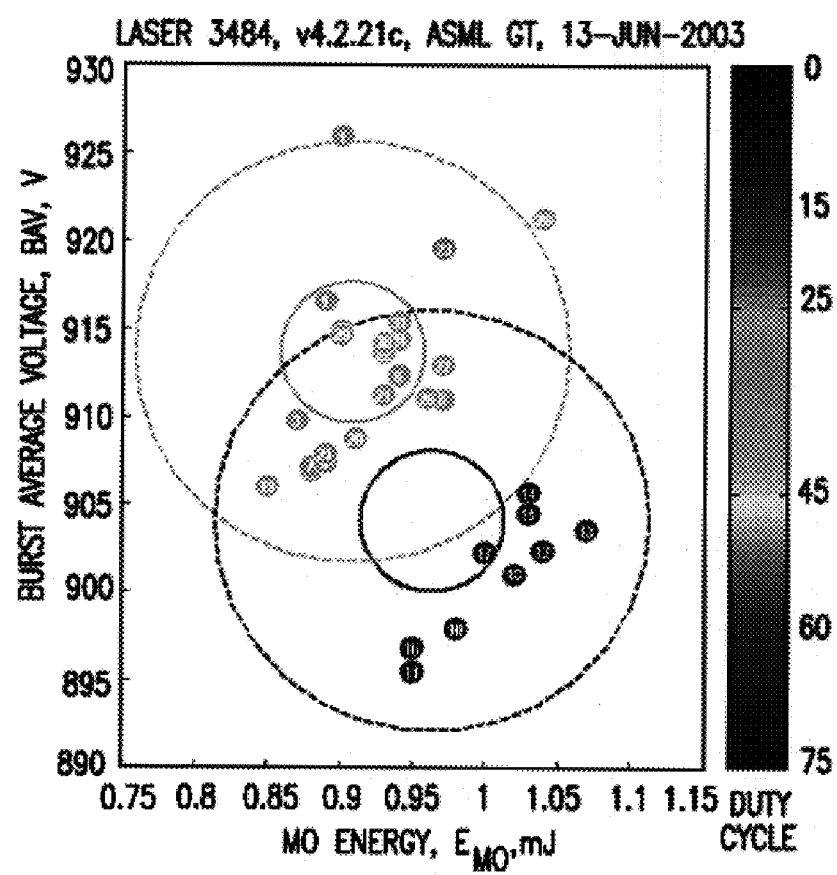
FIG. 8 shows the data points for the beginning points only of the injections tracked in FIG. 7, and the respective target state spaces.

FIG. 7 shows the results of a representative routine gas test for HV vs. Emo, indicating operating within bins 25–45% and 60–100%. The numbered balls indicate the gas state at the start of each inject. The target and inner ring for each of the bins 25%–45% and 60%–100% are also shown. As can be seen in FIG. 8, which is the same data as shown in FIG. 7 with only the inject start points shown, the data tends to be clustered together by duty cycle, on the two different duty cycle target wheels also shown in FIGS. 7 and 8, and tends to group in the target 10a or at least the inner ring 11.

In another embodiment of the present invention there are also used two measured parameters to estimate a 2 variable laser state for an $F_2$ injection algorithm. In this case the parameters, contrary to earlier systems that may have used output bandwidth, as measured in a spectral analysis module ("SAM"), the state of the laser is defined by 2 state variables, namely $F_2$ concentration and wavefront distortion. In addition the laser operating state operating point in a multidimensional state-space coordinate system can be controlled, e.g., by two different actuators, e.g., the F2 concentration, which may be done in the manner described above, and control of the wavefront, e.g., by adjustments made, e.g., by an active beam control device ("BCD"), which may be, e.g., a grating curvature apparatus in, e.g, a line narrowing module ("LNM").

Figure 9:
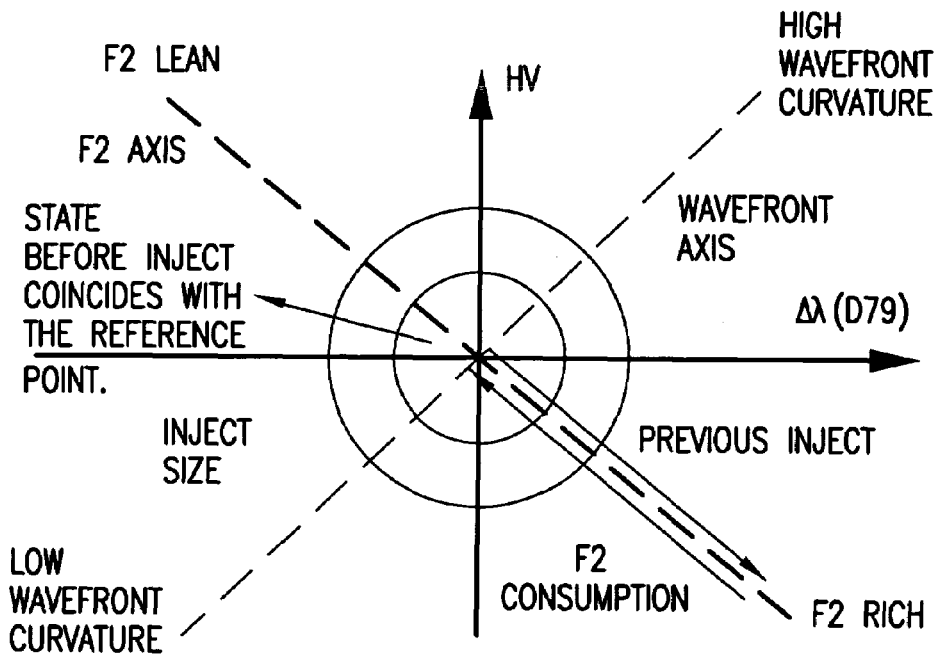
FIG. 9 shows a different multidimensional state space according to an embodiment of the present invention schematically indicating a steady state operation according to an embodiment of the present invention.

As can be seen from FIG. 9, the system according to the present embodiment of the invention also includes a wheel of zones. However, the horizontal axis of Emo replaced by $\lambda$, as indicated by the electrical output of a wavemeter sampling the laser output light pulse beam out of, e.g., the PA, and the PA gas state axis is replaced by the wavefront axis. This may be, e.g., measured by the wavemeter, e.g., as a bandwidth of the laser PA output, e.g., as a full width half max ("FWHM") measurement. The wavefront axis represents relative changes in $\lambda$ that are not related to $F_2$ concentration changes. Similarly, the MO axis has been replaced simply by an $F_2$ axis. This may be thought of as rotating the wheel chart shown in FIGS. 1–5 about the HV axis, to reveal in the plane of the paper a third dimension of the gas state-space, the wavefront and $\lambda$ dimension. This might also be thought of as the BCD dimension since the net correction vector will now involve components of the $F_2$ injection vector and a BCD change vector.

As above with respect to FIG. 2, the state variables are approximately rotated by 45° with respect to the measurement axes for appropriate choice of scaling factors, the scaling being determined empirically by experimentation, e.g., $\Delta\lambda$ and HV. Adjustments are made to the $F_2$ concentration, in both the MO or PA according to the above description. This may be thought of as the MO and PA changes projected onto one axis, which is the single $F_2$ axis in FIGS. 9 and 10. can be made, e.g., by $F_2$ injects to correct the component of the error parallel to the $F_2$ axis as noted above. In this case the system can also, e.g., use BCD adjustments to correct the component of the error parallel to the wavefront axis, i.e., high wavefront curvature to low wavefront curvature.

According to an embodiment of the present invention, e.g., in the $F_2$/BCD wheel case a steady-state may be characterized by the following conditions:

1. The ACR and Voltage reference for all duty-cycle bins are known with sufficient accuracy; and
2. There is no distortion of the wavefront.

In steady-state operation, e.g., the laser operating state moves in the multidimensional state space along the $F_2$ axis. $F_2$ Injects can occur along the semi-axis, by definition of that axis $F_2$ lean to $F_2$ rich. As the laser consumes $F_2$, the laser operating state moves in the multidimensional state-space back to the reference point, following the same semi-axis ($F_2$ rich to $F_2$ lean, as shown by the arrow in FIG. 10. When, e.g., the ACR is well known, e.g., the inject can be requested when the inject is back at the reference point region 10a'. No distortion of the wavefront occurs in steady-state, so that there is no component of the error which is parallel to the wavefront axis.

Figure 10:
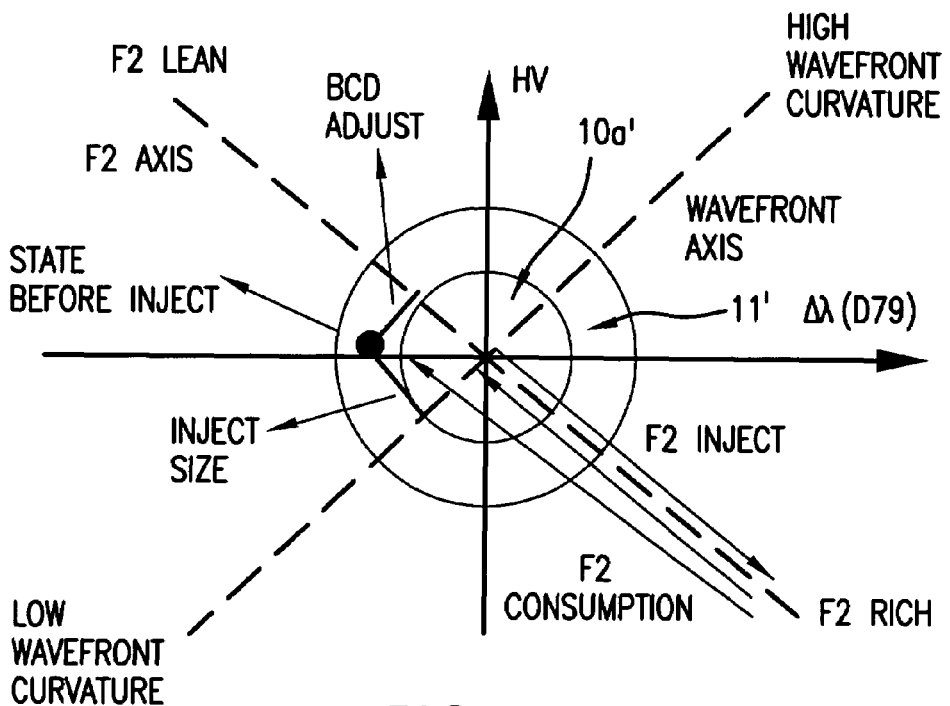
FIG. 10 shows the state space of FIG. 9 schematically showing an operation where there is a need for a change in a parameter other than gas mixture, in addition to gas mixture, according to an embodiment of the present invention.

When the ACR or the voltage reference are completely adapted, the laser state before the inject will still lie along the $F_2$ semi-axis but it may over or under-shoot. Both ACR and Vref will, e.g., adapt to their true value using a mechanism similar to that in the LoFi algorithm, which was an earlier version of a Line of Fluorine for a single chamber laser. The boost logic, e.g., can also be unchanged from that noted above with respect to the Wheel of Fluorine algorithm. However, the error used in the adaptation and boost equation can be different, i.e., it can be based on the error between the gas operating state as indicated in FIG. 10 before an inject and a reference state projected on the $F_2$ axis, e.g., as indicated by the $F_2$ injection arrow in FIG. 10, e.g., with no distortion of the wavefront assumed in this example.

When the "wavefront" component of the error is non-zero, a BCD correction can be applied. This adjustment can occur in closed loop before the inject between the 10K average of the bandwidth and the BCD position. The algorithm can be selected to find a minimum of the wavefront error. this relates to shifting the generally parabolic relationship of the BW by changes in curvature, e.g., of the grating, to a different minimum point by the change in the curvature of the grating, e.g., to adapt to the changing wavefront.

Those skilled in the art will understand that the present invention is subject to many variations and modifications that will be well known and appreciated by those skilled in the art. For example, the bins may be arranged in other than the ranges noted, e.g., by a specific duty cycle and selection of the bin may be made by proximity of the calculated duty cycle to the possible choices identifying each bin or alternatively interpolation may be done between the two adjacent closest bin according to the proximity of the actual duty cycle to the value identifying each such bin. It will also be understood that in three or higher dimensions the "rings" of the wheel will be spheres or such other multidimensional state space structures as are appropriate. It will also be understood by those skilled in the art that the number of rings/spheres or other multidimensional region-defining shapes, as the limit approached infinity, may represent unique curves or surfaces having, e.g., a defined vector distance from the origin, and/or may represent many more that just the several boost values of the presently preferred embodiments and/or be able to be interpolated between adjacent regions to arrive at what approaches a continuum of boost values determined from the position of the operating point in the state-space coordinate system, and region as used in the specification of the present application is intended to encompass regions in a state-space coordinate system that may, e.g., lie in a three dimensional coordinate system but not have three dimensions, e.g., the pints on the surface of a sphere.

We claim:
1. A method for controlling the output of a two chamber gas discharge laser comprising an oscillator gas discharge laser and an amplifier gas discharge laser comprising the steps of:
   establishing a multidimensional variable state space comprising a coordinate system having at least two coordinates, each coordinate comprising a selected variable representing an operating parameter of the oscillator or the amplifier;
   tracking a multidimensional operating point in the multidimensional variable state space according to the variation of the selected variables in either or both of the oscillator or the amplifier to determine the position of the multidimensional operating point in the multidimensional state space;
   determining from the position of the multidimensional operating point in the multidimensional operating space a region from a plurality of defined regions in the multidimensional operating space in which the multidimensional operating point is located and identifying the region;

based upon the identity of the identified region, and parameters of that region relative to the condition of an actuator in each of the oscillator and the amplifier, determining a necessary modification to the actuator for each of the oscillator and the amplifier to attempt to move the multidimensional operating point from the parameters indicated by the position of the multidimensional operating point being in the particular region to a preselected region in the coordinate system.

2. The method of claim 1 further comprising:
the multidimensional state space is a two-dimensional state space.

3. The method of claim 2 further comprising:
the two dimensional state space has one axis as the output energy of the oscillator or the amplifier and a second axis as the operating voltage of the oscillator or the amplifier.

4. The method of claim 2 further comprising the two dimensional state space has one axis as the output energy of the oscillator and one axis as the operating voltage of the amplifier.

5. The method of claim 4 further comprising the operating voltage of the amplifier is equal to the operating voltage of the oscillator.

6. The method of claim 1 further comprising:
the regions in the multidimensional state space comprise an inner target region, having an outer boundary, a first outer region having an inner boundary adjacent to the outer boundary of the inner target region and an outer boundary and a second outer region adjacent to the outer boundary of the first outer region.

7. The method of claim 2 further comprising:
the regions in the multidimensional state space comprise an inner target region, having an outer boundary, a first outer region having an inner boundary adjacent to the outer boundary of the inner target region and an outer boundary and a second outer region adjacent to the outer boundary of the first outer region.

8. The method of claim 3 further comprising:
the regions in the multidimensional state space comprise an inner target region having an outer boundary, a first outer region having an inner boundary adjacent to the outer boundary of the inner target region and an outer boundary and a second outer region adjacent to the outer boundary of the first outer region.

9. The method of claim 4 further comprising:
the regions in the multidimensional state space comprise an inner target region, having an outer boundary, a first outer region having an inner boundary adjacent to the outer boundary of the inner target region and an outer boundary and a second outer region adjacent to the outer boundary of the first outer region.

10. The method of claim 5 further comprising:
the regions in the multidimensional state space comprise an inner target region, having an outer boundary, a first outer region having an inner boundary adjacent to the outer boundary of the inner target region and an outer boundary and a second outer region adjacent to the outer boundary of the first outer region.

11. The method of claim 1 further comprising:
a parameter used in defining the center of the target region and the size of the first outer region is duty cycle.

12. The method of claim 2 further comprising:
a parameter used in defining the center of the target region and the size of the first outer region is duty cycle.

13. The method of claim 3 further comprising:
a parameter used in defining the center of the target region and the size of the first outer region is duty cycle.

14. The method of claim 4 further comprising:
a parameter used in defining the center of the target region and the size of the first outer region is duty cycle.

15. The method of claim 5 further comprising:
a parameter used in defining the center of the target region and the size of the first outer region is duty cycle.

16. The method of claim 11 further comprising:
the actuator is the composition of the gas mixture inside of the oscillator and the composition of the gas mixture inside of the amplifier.

17. The method of claim 12 further comprising:
the actuator is the composition of the gas mixture inside of the oscillator and the composition of the gas mixture inside of the amplifier.

18. The method of claim 13 further comprising:
The actuator is the composition of the gas mixture inside of the oscillator and the composition of the gas mixture inside of the amplifier.

19. The method of claim 14 further comprising:
the actuator is the composition of the gas mixture inside of the oscillator and the composition of the gas mixture inside of the amplifier.

20. The method of claim 15 further comprising:
the actuator is the composition of the gas mixture inside of the oscillator and the composition of the gas mixture inside of the amplifier.

21. A method for controlling the output of a two chamber gas discharge laser comprising an oscillator gas discharge laser and an amplifier gas discharge laser comprising the steps of:

establishing a multidimensional variable state space comprising a coordinate system having at least two coordinates, each coordinate comprising a selected variable representing an operating parameter of the oscillator or the amplifier;

changing the gas mixture in one or both of the oscillator and amplifier by injection of at least one constituent gas in the gas mixture at least part of which injection for the respective oscillator and amplifier is based upon a calculated estimate of consumption of the at least one constituent gas in the gas mixture in the respective oscillator and amplifier from a prior change in the gas mixture; allowing the oscillator and amplifier to operate for a selected period of time with the changed gas mixture;

determining the position of an operating point in the multidimensional variable state space and based upon the location of the operating point in the multidimensional state space determining a respective boost factor to modify the calculated estimate of consumption for the current change of the gas mixture in the respective oscillator and amplifier.

22. The method of claim 21 further comprising:
the multidimensional state space is a two dimensional state space having two coordinates:
the first coordinate is an operating parameter in either of the oscillator and the amplifier; and
the second coordinate is an operating parameter in the other of the oscillator and amplifier from the selected first coordinate.

23. The method of claim 22 further comprising:
the first coordinate is an operating parameter in the amplifier and the second coordinate is an operating parameter in the oscillator.

24. The method of claim 21 further comprising:
the multidimensional state space coordinates define regions of possible change of the gas mixture in the respective oscillator and amplifier.

25. The method of claim 22 further comprising:
the multidimensional state space coordinates define regions of possible change of the gas mixture in the respective oscillator and amplifier.

26. The method of claim 23 further comprising:
the multidimensional state space coordinates define regions of possible change of the gas mixture in the respective oscillator and amplifier.

27. The method of claim 21 further comprising:
the boost factor comprises a +1, 0 or −1.

28. The method of claim 22 further comprising:
the boost factor comprises a +1, 0 or −1.

29. The method of claim 23 further comprising:
the boost factor comprises a +1, 0 or −1.

30. The method of claim 24 further comprising:
the boost factor comprises a +1, 0 or −1.

31. The method of claim 25 further comprising:
the boost factor comprises a +1, 0 or −1.

32. The method of claim 26 further comprising:
the boost factor comprises a +1, 0 or −1.

33. The method of claim 1 further comprising:
the first coordinate is operating voltage and the second coordinate is a measure of a spectral characteristic of the output of the oscillator or the amplifier.

34. The method of claim 1 further comprising:
the second coordinate is the bandwidth of the output of the amplifier.

35. The method of claim 33 further comprising:
the position of an operating point in the multidimensional state space is indicative of a needed correction to the spectral characteristic of the output of the oscillator or the amplifier;
changing the spectral characteristic of the output of the oscillator or the amplifier using a beam correction device.

36. The method of claim 34 further comprising:
the position of an operating point in the multidimensional state space is indicative of a needed correction to the spectral characteristic of the output of the oscillator or the amplifier;
changing the spectral characteristic of the output of the oscillator or the amplifier using a beam correction device.

37. The method of claim 21 further comprising:
the first coordinate is operating voltage and the second coordinate is a measure of a spectral characteristic of the output of the oscillator or the amplifier.

38. The method of claim 37 further comprising:
the second coordinate is the bandwidth of the output of the amplifier.

39. The method of claim 37 further comprising:
the position of an operating point in the multidimensional state space is indicative of a needed correction to the spectral characteristic of the output of the oscillator or the amplifier:
changing the spectral characteristic of the output of the oscillator or the amplifier using a beam correction device.

40. The method of claim 38 further comprising:
the position of an operating point in the multidimensional state space is indicative of a needed correction to the spectral characteristic of the output of the oscillator or the amplifier;
changing the spectral characteristic of the output of the oscillator or the amplifier using a beam correction device.

41. An apparatus for controlling the output of a two chamber gas discharge laser comprising an oscillator gas discharge laser and an amplifier gas discharge laser comprising:
means for tracking in a multidimensional variable state space comprising a coordinate system having at least two coordinates, each coordinate comprising a selected variable representing an operating parameter of the oscillator or the amplifier, a multidimensional operating point in the multidimensional variable state space according to the variation of the selected variables in either or both of the oscillator or the amplifier;
means for determining from the position of the multidimensional operating point in the multidimensional operating space a region from a plurality of defined regions in the multidimensional operating space in which the multidimensional operating point is located and for identifying the region;
based upon the identity of the identified region, and parameters of that region relative to the condition of an actuator in each of the oscillator and the amplifier, determining a necessary modification to the actuator for each of the oscillator and the amplifier to attempt to move the multidimensional operating point from the parameters indicated by the position of the multidimensional operating point being in the particular region to a preselected region in the coordinate system.

42. An apparatus for controlling the output of a two chamber gas discharge laser comprising an oscillator gas discharge laser and an amplifier gas discharge laser comprising:
means for tracking in a multidimensional variable state space comprising a coordinate system having at least two coordinates, each coordinate comprising a selected variable representing an operating parameter of the oscillator or the amplifier, an operating point in the state space;
means for changing the gas mixture in one or both of the oscillator and amplifier by injection of at least one constituent gas in the gas mixture at least part of which injection for the respective oscillator and amplifier is based upon a calculated estimate of consumption of the at least one constituent gas in the gas mixture in the respective oscillator and amplifier from a prior change in the gas mixture;
means for determining, after allowing the oscillator and amplifier to operate for a selected period of time with the changed gas mixture, the position of an operating point in the multidimensional variable state space and based upon the location of the operating point in the multidimensional state space for determining a respective boost factor to modify the calculated estimate of consumption for the current change of the gas mixture in the respective oscillator and amplifier.

* * * * *

UNITED STATES PATENT AND TRADEMARK OFFICE
CERTIFICATE OF CORRECTION

PATENT NO. : 7,209,507 B2
APPLICATION NO. : 10/740659
DATED : April 24, 2007
INVENTOR(S) : Rule et al.

It is certified that error appears in the above-identified patent and that said Letters Patent is hereby corrected as shown below:

Column 20:
Line 15 of Claim 1, add --variable-- after "dimensional".
Line 17, Claim 1, add --variable state-- and delete "operating" after "multidimensional".

Column 21:
Line 1, add --variable state-- and delete "operating" after "multidimensional".
Line 2 of Claim 2, add --variable-- after "multidimensional".
Line 2 of Claim 4, add --variable-- after "dimensional".
Line 2 of Claim 6, add --variable-- after "multidimensional".
Line 2 of Claim 7, add --variable-- after "multidimensional".
Line 2 of Claim 8, add --variable-- after "multidimensional".
Line 2 of Claim 9, add --variable-- after "multidimensional".
Line 2 of Claim 10, add --variable-- after "multidimensional".

Column 22:
Line 22 of Claim 21, add --variable-- after "multidimensional".
Line 2 of Claim 22, add --variable-- after "multidimensional".
Line 2 of Claim 22, add --variable-- after "dimensional".

Column 23:
Line 2 of Claim 24, add --variable-- after "multidimensional".
Line 2 of Claim 25, add --variable-- after "multidimensional".
Line 2 of Claim 26, add --variable-- after "multidimensional".
Line 2 of Claim 35, add --variable-- after "multidimensional".
Line 2 of Claim 36, add --variable-- after "multidimensional".
Line 2 of Claim 39, add --variable-- after "multidimensional".

UNITED STATES PATENT AND TRADEMARK OFFICE
CERTIFICATE OF CORRECTION

PATENT NO. : 7,209,507 B2
APPLICATION NO. : 10/740659
DATED : April 24, 2007
INVENTOR(S) : Rule et al.

It is certified that error appears in the above-identified patent and that said Letters Patent is hereby corrected as shown below:

Column 24:
Line 2 of Claim 40, add --variable-- after "multidimensional".
Line 8 of Claim 42, add --or output-- after "operating".
Line 24 of Claim 42, add --variable-- after "multidimensional".

Signed and Sealed this

Fourteenth Day of April, 2009

JOHN DOLL
*Acting Director of the United States Patent and Trademark Office*